(12) United States Patent
Wang et al.

(10) Patent No.: US 12,375,122 B2
(45) Date of Patent: Jul. 29, 2025

(54) BAND CONFLICT RESOLUTION FOR DUAL RECEIVE DUAL SIM DUAL STANDBY SCENARIOS

(71) Applicant: Apple Inc., Cupertino, CA (US)

(72) Inventors: Beibei Wang, San Jose, CA (US); Erdogan Dede, San Diego, CA (US); Rajshekhar Oruganti, Bangalore (IN); Shrenik Patravali, San Diego, CA (US); Trushang Shah, Bangalore (IN); Li Su, Cupertino, CA (US); Baris Efe, San Diego, CA (US); Satheesha B Rangegowda, San Diego, CA (US); Praveen Janarthanan, San Diego, CA (US); Zhao Wang, San Diego, CA (US); Bin Hu, San Diego, CA (US)

(73) Assignee: Apple Inc., Cupertino, CA (US)

( * ) Notice: Subject to any disclaimer, the term of this patent is extended or adjusted under 35 U.S.C. 154(b) by 403 days.

(21) Appl. No.: 17/934,928

(22) Filed: Sep. 23, 2022

(65) Prior Publication Data

US 2023/0107904 A1   Apr. 6, 2023

(30) Foreign Application Priority Data

Oct. 4, 2021 (IN) .............................. 202111045011

(51) Int. Cl.
*H04B 1/58* (2006.01)
*H04W 72/0453* (2023.01)
*H04W 72/566* (2023.01)

(52) U.S. Cl.
CPC .......... *H04B 1/58* (2013.01); *H04W 72/0453* (2013.01); *H04W 72/566* (2023.01)

(58) Field of Classification Search
CPC .. H04B 1/58; H04W 72/0453; H04W 72/566; H04W 8/183; H04W 88/06
See application file for complete search history.

(56) References Cited

U.S. PATENT DOCUMENTS

2015/0334575 A1* 11/2015 Joshi ......................... H04L 1/00
  370/329
2016/0126992 A1*  5/2016 Hu ............................. H04B 1/12
  455/296
2017/0295513 A1* 10/2017 Lee ......................... H04W 40/12

* cited by examiner

*Primary Examiner* — Sun Jong Kim
(74) *Attorney, Agent, or Firm* — Fish & Richardson P.C.

(57) ABSTRACT

A process for dual subscriber identity module (SIM) dual standby (DR-DSDS) operation including receiving event data indicating a trigger event configuring radio frequency (RF) hardware; identifying a conflict between a communication band of a first SIM and a communication band of a second SIM for DR-DSDS operation; determining a type of the conflict; determining, a first priority value for a component carrier (CC) corresponding to the first SIM, and a second priority value for a CC corresponding to the second SIM, the first and second priority values based at least on the type of the conflict; determining a timing scenario for configuring the RF hardware; searching for a RF hardware configuration to resolve the conflict based on the first and second priority values; and generating RF handle data, corresponding to the conflict resolution, specifying a RF hardware configuration for the DR-DSDS operation.

20 Claims, 11 Drawing Sheets

BAND CONFLICT RESOLUTION FOR DUAL RECEIVE DUAL SIM DUAL STANDBY SCENARIOS

CLAIM OF PRIORITY

This application claims priority under 35 U.S.C. § 119(b) to Indian Patent Application Serial No. 202111045011, filed on Oct. 4, 2021, the entire contents of which are hereby incorporated by reference.

TECHNICAL FIELD

This disclosure relates generally to wireless communications.

BACKGROUND

A dual-subscriber identity module (SIM) definition for a wireless device, such as a user equipment (UE), specifies whether the UE is capable of supporting two SIM cards. Two types of Dual-SIM UE are Dual-SIM Active and Dual-SIM Standby. Dual-SIM Standby (DSS) requires the UE to specify which of the two SIMS is able to make and receive calls, while Dual-SIM Active (DSA) enables both SIMs to receive calls at the same time. The latter feature usually requires an additional transceiver for the secondary SIM card, and as such consumes more battery life. However, Dual-SIM Dual-Standby (DSDS) enables a UE to have two active SIMs with only one transceiver.

SUMMARY

This application describes data processing systems and processes for band conflict resolution for dual receive, Dual-SIM Dual-Standby (DR-DSDS) scenarios. The disclosed data processing systems and processes include techniques for radio frequency (RF) handle generation and RF configuration when a band conflict occurs between a first SIM and a second SIM of a UE. The RF handle is data that specifies what the RF hardware configuration that needs to be setup before turning on RF. Generally, the RF handle includes a number associated with RF configuration, which is description of RF hardware configuration prepared by the UE that needs to be set up before RF can be turned on.

The RF handle is associated with an RF configuration (also called an RF hardware configuration), and provides a description of a particular RF hardware configuration of the UE that is set up before the RF hardware are turned on.

RF configuration execution (also called hardware configuration) includes a sequence of actions taken in response to a trigger event, and includes hardware execution of a semi-static RF configuration specified by an RF handle.

Generally, the processes described herein are a part of multiple SIM (MSIM) arbitration. MSIM RF arbitration includes determining when each SIM, of two or more SIMs in a system, are configured to perform operations such as transmitting or receiving data or otherwise using the transceiver or other communal hardware. The arbitration applies a set of rules for determining, in a given situation, which SIM has higher priority and whether the RF configurations requested for different SIMs are capable of operating in parallel. In some implementations, the processes are a part of arbitration between CDMA and LTE/NR in Single Radio Long Term Evolution (SRLTE) in SSIM. The arbitration comprises operating bands for LTE/NR/DC band combinations as described in the following specifications. LTE-LTE MSIM Band combinations can utilize LTE carrier aggregation (CA) for the combinations described in 3GPP TS 36.101 section 5.5A. FR1/FR1 MSIM Band combinations can utilize NR frequency range 1 (FR1) CA as described in TS 38.101-Part 1 section 5.2. FR2/FR2 MSIM band combinations can utilize NR frequency range 2 (FR2) CA as described in TS 38.101-Part 2 section 5.2A. The FR1/FR2 MSIM band combinations can utilize NR FR1+FR2 CA as described in 38.101-Part 3 section 5.2A. The LTE/NR, EN-DC/LTE, EN-DC/NR, NE-DC/LTE, NE-DC/NR MSIM band combinations can utilize EN-DC/NE-DC DC as described in TS 38.101-Part 3 section 5.2B. The data processing system can support operation on one or both SIMS, such as LTE operations on a first SIM and NR on a second SIM, NR operations on both SIMs, and so forth. In addition to utilizing DC/CA combinations defined in the 3GPP specification, MSIM band combinations can include band combinations that are not defined in 3GPP specification but supported by RF HW, on first and second SIMS, respectively. For example: 2G/3G/CDMA and LTE/NR band combinations that are supported by RF HW; LTE/NR and LTE/NR band combinations supported by RFSW but not defined in 3GPP DC/CA Combination; or 2G/3G/CDMA and 2G/3G/CDMA band combinations.

The systems and processes described in this document enable one or more of the following advantages, among other advantages. There are different timeline requirements for performing a search of the Path Configuration Table (PCT). The PCT includes data representing supported RF configurations for transmission and reception paths for the UE. For example, the band conflict resolution may be time critical such that a transmission/transmit (Tx) or a reception/receive (Rx) request is received very close in time to an idle paging operation (PO). In this case, the data processing system of the UE is configured to execute a partial PCT search mode in which a particular subset of RF configurations are considered for generation of the RF handle. In circumstances in which the band conflict resolution is not time critical, the data processing system of the UE performs a complete search of the PCT for RF handle generation. Thus, the UE is configured to generate an RF handle to resolve band conflicts between SIMS even in situations in which exhaustive PCT search is time-prohibited. This increases flexibility of the DR-DSDS operations of the UE.

The disclosed techniques are realized by one or more implementations, which include the following.

In a general aspect, a method performed by user equipment (UE) includes the following operations. The method includes receiving event data indicating a trigger event configuring radio frequency (RF) hardware for a dual-receive, dual subscriber identity module (SIM) dual standby (DR-DSDS) operation by the UE. The method includes identifying a conflict between a communication band of a first SIM and a communication band of a second SIM for the DR-DSDS operation. The method includes determining a type of the conflict. The method includes, upon determining the type of the conflict, determining, a first priority value for a component carrier (CC) of the DR-DSDS operation corresponding to the first SIM, and a second priority value for a CC of the DR-DSDS operation corresponding to the second SIM, the first and second priority values based at least on the type of the conflict. The method includes determining a timing scenario for configuring the RF hardware. The method includes, based on determining the timing scenario, performing a search for a RF hardware configuration for a resolution of the conflict based on the first and second priority values. The method includes, in response to performing the search, generating RF handle data corresponding to the resolution of the conflict, the RF handle data specifying a RF hardware configuration for the DR-DSDS operation.

In some implementations, the determining the timing scenario for configuring the RF hardware and performing the search based on determining the timing scenario includes determining an amount of time between the trigger event and a next idle activity of the first SIM or the second SIM; comparing the amount of time to a threshold amount of time; based on the comparison, performing one of a non-exhaustive path configuration table (PCT) search or an exhaustive PCT search, comprising: when the amount of time exceeds the threshold amount of time, generating the RF handle data based on the non-exhaustive PCT search; and when the amount of time does not exceed the threshold amount of time, generating the RF handle data based on the exhaustive PCT search.

In some implementations, the generating the RF handle data based on the exhaustive PCT search comprises: determining that the type of the conflict comprises a transmit (Tx) CC on the first SIM that conflicts with a receive (Rx) CC on the second SIM; and based on the determining, generating RF handle data that drops the Tx CC that conflicts with the Rx CC.

In some implementations, generating the RF handle data based on the exhaustive PCT search comprises: determining that the type of the conflict comprises a first Rx CC on the first SIM and a second Rx CC on the second SIM and that the conflict comprises a Rx chain resource conflict; and based on the determining, generating RF handle data that removes at least one Rx path from the first Rx CC and assigns the at least one Rx path to the second CC, the first Rx CC having a lower priority compared to the second Rx CC.

In some implementations, generating the RF handle data based on the non-exhaustive PCT search comprises: determining that the amount of time exceeds a minimum time threshold; based on the determining, receiving data specifying a signal condition level; determining that the signal condition level satisfies a threshold signal condition level; in response to determining that the signal condition level satisfies the threshold signal condition level, dropping a CC that has a lowest priority of a set of CCs from the RF handle data; confirming, in response to dropping the CC having the lowest priority from the RF handle data, that a remaining set of CCs represent a compatible RF handle in which the first SIM and second SIM operate in parallel without band conflicts; and generating, based on the confirming, the RF handle data that comprises the remaining set of CCs.

In some implementations, generating the RF handle data based on the non-exhaustive PCT search comprises: determining that the amount of time exceeds a minimum time threshold; based on the determining, receiving data specifying a signal condition level; determining that the signal condition level does not satisfy a threshold signal condition level; in response to determining that the signal condition level does not satisfy the threshold signal condition level, retaining (i) primary cell (PCell) data and (ii) primary cell of a secondary cell group (PSCell) data in a packet call; and generating the RF handle data comprising a first CC for the first SIM representing an Idle operation and a second CC for the second SIM, the second CC including the PCell data and the PSCell data for the second SIM.

In some implementations, the threshold amount of time is determined based on timing of one or more paging operations of the first SIM or the second SIM.

In some implementations, the method includes receiving conflict data specifying at least one SCell band conflict for the first SIM; determining, in response to receiving the conflict data, that the second SIM is not active; and generating RF handle data specifying a packet call having full capacity support including all CCs.

In some implementations, the method includes receiving conflict data specifying at least one SCell band conflict for the first SIM; determining, in response to receiving the conflict data, that the second SIM is active; and generating RF handle data specifying a packet call having reduced capacity support by removing at least one of a conflicting Rx CC, a conflicting Tx CC, or a conflicting Rx CC Rx path.

In some implementations, determining a type of the conflict comprises: determining that the conflict includes a Pcell-PScell conflict between the first SIM and the second SIM; determining that one of the first SIM or the second SIM is idle; suspending a packet call when one of the first SIM or the second SIM that is idle is prepared for paging operations that include a streaming activity; and resuming the packet call when the streaming activity is completed.

In a general aspect, user equipment (UE) includes a first subscriber identity module (SIM); a second SIM; radio frequency (RF) hardware; and at least one processor in communication with the first SIM, the second SIM, and the RF hardware, the at least one processor configured to perform operations comprising: receiving event data indicating a trigger event configuring the RF hardware for a dual-receive, dual-SIM dual standby (DR-DSDS) operation; identifying a conflict between a communication band of the first SIM and a communication band of the second SIM for the DR-DSDS operation; determining a type of the conflict; upon determining the type of the conflict, determining, a first priority value for a component carrier (CC) of the DR-DSDS operation corresponding to the first SIM, and a second priority value for a CC of the DR-DSDS operation corresponding to the second SIM, the first and second priority values based at least on the type of the conflict; determining a timing scenario for configuring the RF hardware; based on determining the timing scenario, performing a search for a RF hardware configuration for a resolution of the conflict based on the first and second priority values; and in response to performing the search, generating RF handle data corresponding to the resolution of the conflict, the RF handle data specifying a RF hardware configuration for the DR-DSDS operation.

In some implementations, the determining the timing scenario for configuring the RF hardware and performing the search based on determining the timing scenario includes determining an amount of time between the trigger event and a next idle activity of the first SIM or the second SIM; comparing the amount of time to a threshold amount of time; based on the comparison, performing one of a non-exhaustive path configuration table (PCT) search or an exhaustive PCT search, comprising: when the amount of time exceeds the threshold amount of time, generating the RF handle data based on the non-exhaustive PCT search; and when the amount of time does not exceed the threshold amount of time, generating the RF handle data based on the exhaustive PCT search.

In some implementations, the generating the RF handle data based on the exhaustive PCT search comprises: determining that the type of the conflict comprises a transmit (Tx) CC on the first SIM that conflicts with a receive (Rx) CC on the second SIM; and based on the determining, generating RF handle data that drops the Tx CC that conflicts with the Rx CC.

In some implementations, generating the RF handle data based on the exhaustive PCT search comprises: determining that the type of the conflict comprises a first Rx CC on the first SIM and a second Rx CC on the second SIM and that the conflict comprises a Rx chain resource conflict; and based on the determining, generating RF handle data that removes at least one Rx path from the first Rx CC and assigns the at least one Rx path to the second CC, the first Rx CC having a lower priority compared to the second Rx CC.

In some implementations, generating the RF handle data based on the non-exhaustive PCT search comprises: determining that the amount of time exceeds a minimum time threshold; based on the determining, receiving data specifying a signal condition level; determining that the signal condition level satisfies a threshold signal condition level; in response to determining that the signal condition level satisfies the threshold signal condition level, dropping a CC that has a lowest priority of a set of CCs from the RF handle data; confirming, in response to dropping the CC having the lowest priority from the RF handle data, that a remaining set of CCs represent a compatible RF handle in which the first SIM and second SIM operate in parallel without band conflicts; and generating, based on the confirming, the RF handle data that comprises the remaining set of CCs.

In some implementations, generating the RF handle data based on the non-exhaustive PCT search comprises: determining that the amount of time exceeds a minimum time threshold; based on the determining, receiving data specifying a signal condition level; determining that the signal condition level does not satisfy a threshold signal condition level; in response to determining that the signal condition level does not satisfy the threshold signal condition level, retaining (i) primary cell (PCell) data and (ii) primary cell of a secondary cell group (PSCell) data in a packet call; and generating the RF handle data comprising a first CC for the first SIM representing an Idle operation and a second CC for the second SIM, the second CC including the PCell data and the PSCell data for the second SIM.

In some implementations, the threshold amount of time is determined based on timing of one or more paging operations of the first SIM or the second SIM.

In some implementations, the method includes receiving conflict data specifying at least one SCell band conflict for the first SIM; determining, in response to receiving the conflict data, that the second SIM is not active; and generating RF handle data specifying a packet call having full capacity support including all CCs.

In some implementations, the method includes receiving conflict data specifying at least one SCell band conflict for the first SIM; determining, in response to receiving the conflict data, that the second SIM is active; and generating RF handle data specifying a packet call having reduced capacity support by removing at least one of a conflicting Rx CC, a conflicting Tx CC, or a conflicting Rx CC Rx path.

In some implementations, determining a type of the conflict comprises: determining that the conflict includes a Pcell-PScell conflict between the first SIM and the second SIM; determining that one of the first SIM or the second SIM is idle; suspending a packet call when one of the first SIM or the second SIM that is idle is prepared for paging operations that include a streaming activity; and resuming the packet call when the streaming activity is completed.

The details of one or more implementations are set forth in the accompanying drawings and the description below. The techniques described here can be implemented by one or more wireless communication systems, components of a wireless communication system (e.g., a station, an access point, a user equipment, a base station, etc.), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
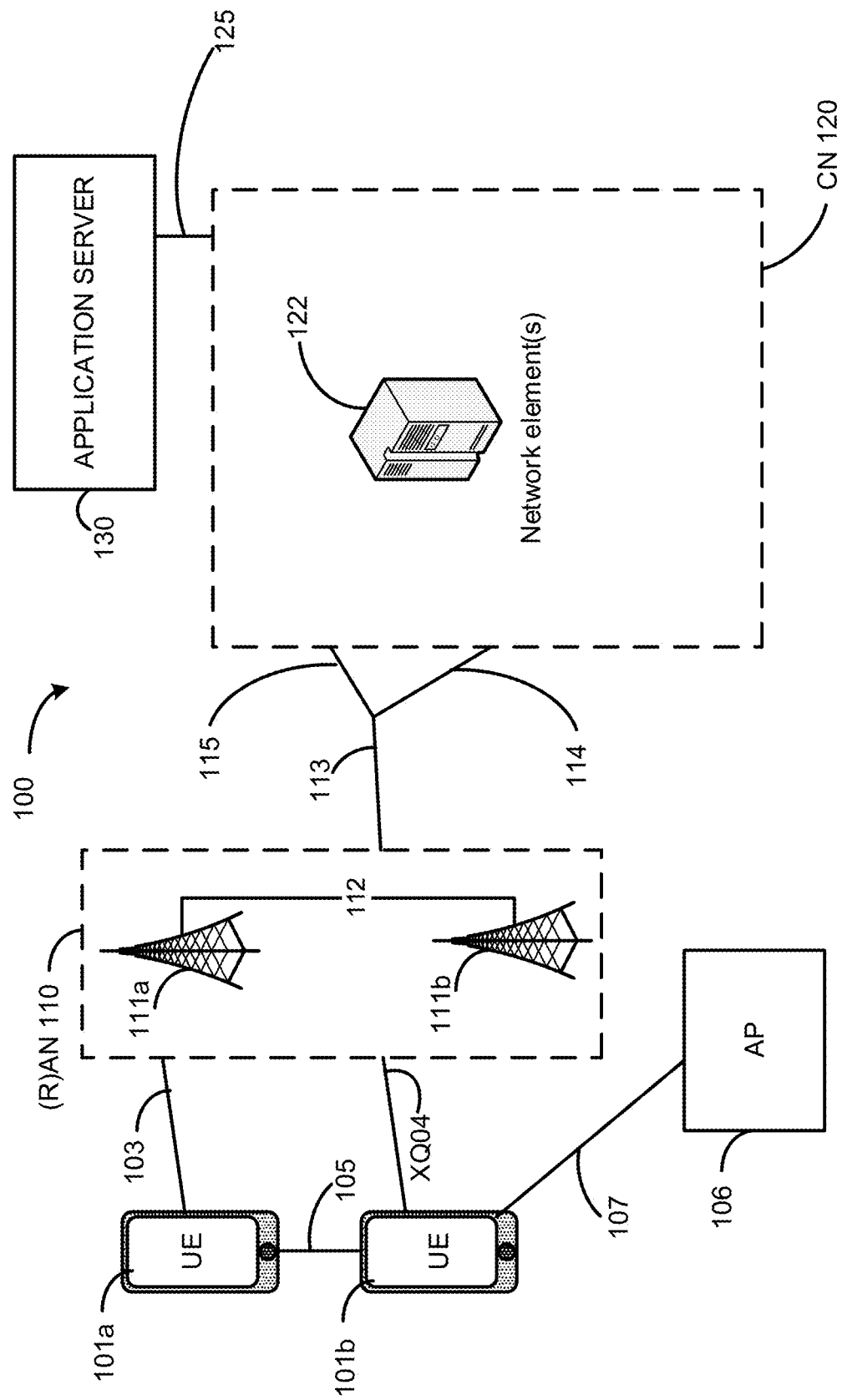
FIG. 1 illustrates an example wireless communication system, according to various implementations herein.

Conflicts between SIMs in DR-DSDS functionality are resolved by a UE by generating RF handles representing non-conflicting hardware configurations in advance of the conflict. Generally, RF handle is a number associated with a RF configuration at run time. The RF handle represents a complete RF hardware configuration that is initialized before sending or receiving data using the RF HW. The RF handle is generally prepared in a non-time critical context, such as during radio resource control (RRC) configuration. The RF handle is associated with an RF configuration (also called an RF hardware configuration), and provides a description of a particular RF hardware configuration of the UE that is set up before the RF hardware are turned on. The RF configuration refers to the actual hardware configuration of the UE. RF handle generation typically is a mid- or low-priority task executing together with other layer 1 component carrier tasks on a same data processing system (e.g., core) of a UE. RF configuration execution (also called hardware configuration) includes a sequence of actions taken in response to a trigger event, and includes hardware execution of a semi-static RF configuration specified by an RF handle. In other words, when executing the hardware configuration, the hardware is operating in accordance with the configuration specified in the active RF handle. The configuration of the hardware in accordance with the RF handle can be scheduled in time-critical context. The requested RF configuration of the UE is applied on a specified RF handle. The hardware configuration can be triggered by events like download channel or transmit channel start, Inter Radio Access Technology (IRAT) or inter frequency (IFREQ) measurement, dynamic RxD, best transmitter antenna selection, MAC control element (CE) SCell activate or deactivate messages, downlink control information (DCI) decoded bandwidth part (BWP) switch request messages, and so forth.

A wireless computing device, such as a UE or a portion thereof, is configured to determine a classification of a band conflict. The band conflict can be a transmission/transmit (Tx) and reception/receive (Rx) conflict between a first SIM and a second SIM, or a Rx-Rx conflict between the first SIM and the second SIM. For example, for a Tx/Rx conflict, one SIM is attempting to transmit while the other SIM is receiving. For a Rx/Rx conflict, both SIMs are attempting to receive, which may cause a conflict for associated hardware in the Rx chain configured to process the received data.

The band conflict can occur between two component carriers (CC). Each component carrier is configured for use within an operating frequency or frequencies. For example, each CC represents aggregated carriers in a single band (intra-band continuous or non-continuous) or multiple bands (inter-band, non-continuous).

Each CC is associated with a priority value, as subsequently described. Lower priority CCs are dropped if conflicting with higher priority CCs. CC priority is determined based on a cell type (e.g., Primary or Secondary), service type (e.g., Data, Idle, Voice, etc.), and signal conditions. Priority values of the CCs are subsequently described in greater detail in relation to Table 1.

In response to detecting a conflict, the data processing system of the UE is configured to access data representing a plurality of search modes to search an RF Path Configuration Table (PCT) for band conflict handing. The PCT includes structured data that specifies, for example, which RF configuration(s) are optimal for a given DR-DSDS scenario in the context of a particular band conflict. Each search mode specifies a particular process for accessing the PCT and determining the RF configuration for a particular band conflict.

There are different timeline requirements for performing a search of the PCT. For example, the band conflict resolution may be time critical. For example a Tx/Rx request is received very close in time to an idle paging operation (PO). In this case, the data processing system of the UE is configured to execute a partial PCT search mode in which a particular subset of RF configurations are considered for generation of the RF handle. In circumstances in which the band conflict resolution is not time critical, the data processing system of the UE performs a complete search of the PCT for RF handle generation. The time critical and non-time critical scenarios are described in further detail below in relation to FIGS. 5-10.

Generally, the processes described herein are a part of multiple SIM (MSIM) arbitration. In some implementations, the processes are a part of Single Radio CDMA/LTE/NR arbitration in SSIM. The arbitration includes determining which SIM/RAT is permitted to perform operations on limited hardware (such as transmit or receive data using the transceiver) based on a priority hierarchy associated with the operations. The arbitration comprises operating bands for LTE/NR/DC band combinations as described in the following specifications. LTE/LTE MSIM Band combinations can leverage LTE carrier aggregation (CA) for the combinations described in 3GPP TS 36.101 section 5.5A. The FR1/FR1 MSIM band combinations can leverage NR frequency range 1 (FR1) CA as described in TS 38.101-Part 1 section 5.2. The FR2/FR2 band combinations can utilize NR frequency range 2 (FR2) CA as described in TS 38.101-Part 2 section 5.2A. The FR1/FR2 MSIM band combinations can leverage NR FR1+FR2 CA as described in 38.101-Part 3 section 5.2A. The LTE-NR, EN-DC/LTE, EN-DC/NR, NE-DC/NR, NE-DC/NR MSIM band combinations can utilize EN-DC/NE-DC DC as described in TS 38.101-Part 3 section 5.2B. The data processing system can support operations on one or both SIMS, such as LTE operations on a first SIM and NR on a second SIM, NR operations on both SIMS, and so forth. In addition to using defined DC/CA combinations, MSIM band combinations can include band combinations that are not defined in a 3GPP specification, but supported by RF HW on first and second SIMS, respectively. For example: 2G/3G/CDMA and LTE/NR band combinations that are supported by RF HW; LTE/NR and LTE/NR band combinations supported by RFSW but not defined in 3GPP DC/CA Combination; or 2G/3G/CDMA and 2G/3G/CDMA band combinations.

Generally, the processes described herein are associated with physical layer (layer 1) operations. The UE includes one or more arbitration server modules configured for service arbitration. The service arbitration can arbitrate services for Code Division Multiple Access (CDMA) 1x or LTE/NR for SRLTE. In some implementations, the service arbitration is performed for dual SIM modes. Multi-SIM conflict handling is performed by a data processing system, which may include a resource arbitrator unit (RAU). The RAU includes a controller or other computing device configured to perform conflict resolution for SRLTE and MSIM (both SR-DSDS and DR-DSDS). The RAU is configured to allocate Tx/Rx resources and other hardware resources to a highest priority resource request. If resource requests (for SIM 1 and SIM 2) are equal, the RAU is configured to randomize the allocation of resources. The operations described herein are related to L1 control and radio frequency software control (RFSW) design for DR-DSDS support.

FIG. 1 illustrates an example of a wireless communication system 100. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

The UEs 101 may be configured to connect, for example, communicatively couple, with RAN 110. In implementations, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various implementations, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various implementations, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the RAN nodes 111 may be implemented as one or more software entities running on server computers as part of a virtual network, which may be referred to as a CRAN and/or a virtual baseband unit pool (vBBUP). In these implementations, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111.

Any of the RAN nodes 111 can terminate the air interface protocol and can be the first point of contact for the UEs 101. In some implementations, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In implementations, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the implementations is not limited in this respect. The OFDM signals can comprise a plurality of orthogonal subcarriers.

In some implementations, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various implementations, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some implementations may use concepts for resource allocation for control channel information that are an extension of the above-described concepts. For example, some implementations may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In implementations where the system 100 is an LTE system, the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In implementations where the system 100 is a 5G or NR system, the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this implementation, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some implementations, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In implementations, the CN 120 may be a 5GC (referred to as "5GC 120" or the like), and the RAN 110 may be connected with the CN 120 via an NG interface 113. In implementations, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs.

In implementations, the CN 120 may be a 5G CN (referred to as "5GC 120" or the like), while in other implementations, the CN 120 may be an EPC). Where CN 120 is an EPC (referred to as "EPC 120" or the like), the RAN 110 may be connected with the CN 120 via an S1 interface 113. In implementations, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMES.

Figure 2:
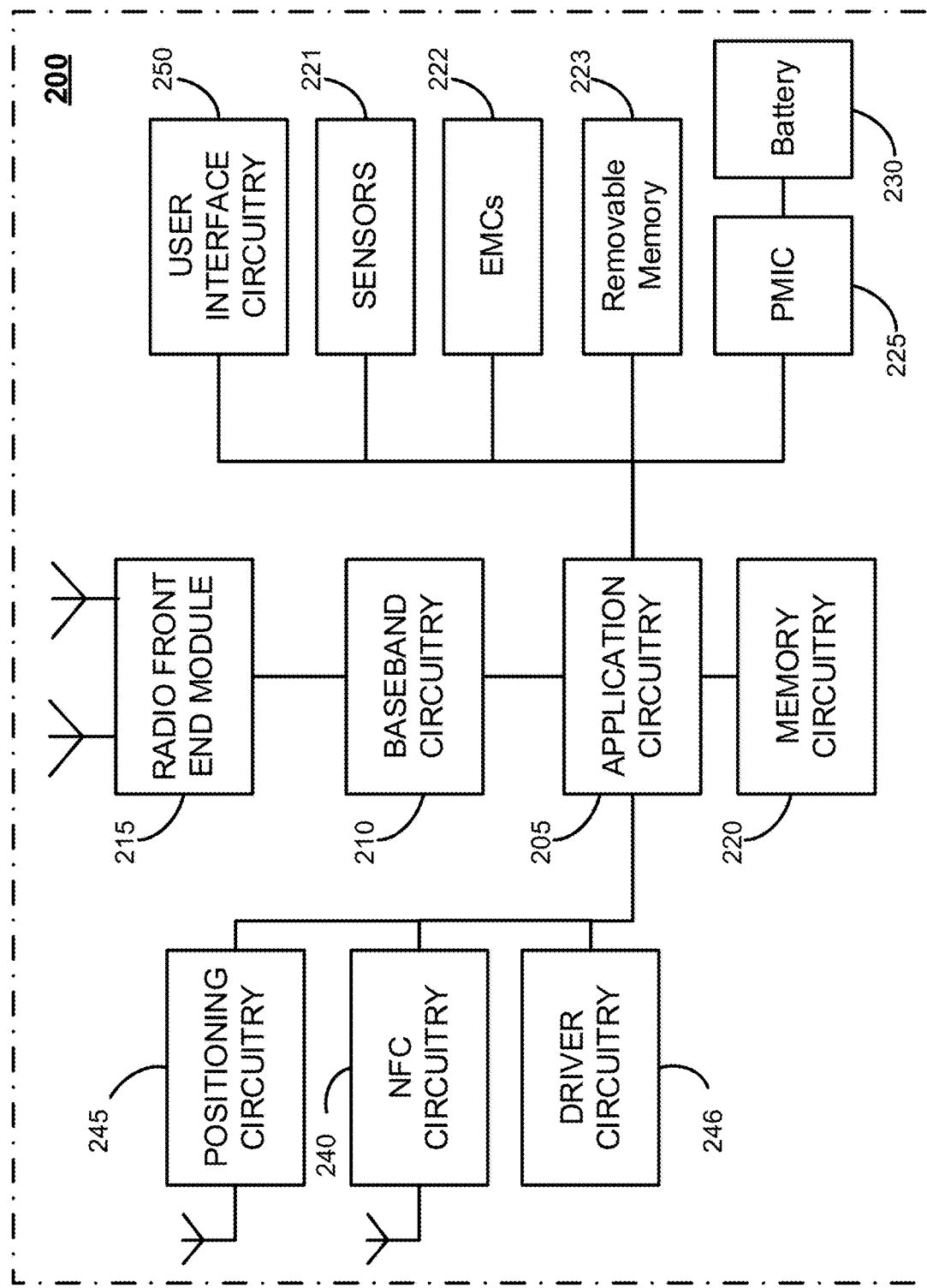
FIG. 2 illustrates an example of a computing device in accordance with various implementations.

FIG. 2 illustrates an example of a platform 200 (or "device 200") in accordance with various implementations. In implementations, the computer platform 200 may be suitable for use as UEs 101, application servers, and/or any other element/device discussed herein. The platform 200 may include any combinations of the components shown in the example. The components of platform 200 may be implemented as integrated circuits (ICs), portions thereof, discrete electronic devices, or other modules, logic, hardware, software, firmware, or a combination thereof adapted in the computer platform 200, or as components otherwise incorporated within a chassis of a larger system. The block diagram of FIG. 2 is intended to show a high level view of components of the computer platform 200. However, some of the components shown may be omitted, additional components may be present, and different arrangement of the components shown may occur in other implementations.

Application circuitry 205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports.

The processor(s) of application circuitry may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some implementations, the application circuitry may comprise, or may be, a special-purpose processor/controller to operate according to the various implementations herein.

As examples, the processor(s) of application circuitry 205 may include an Apple A-series processor. The processors of the application circuitry 205 may also be one or more of an Intel® Architecture Core™ based processor, such as a Quark™, an Atom™ an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 205 may be a part of a system on a chip (SoC) in which the application circuitry 205 and other components are formed into a single integrated circuit.

Additionally or alternatively, application circuitry 205 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like.

The baseband circuitry 210 may be implemented, for example, as a solder-down substrate including one or more integrated circuits, a single packaged integrated circuit soldered to a main circuit board or a multi-chip module containing two or more integrated circuits.

The RFEMs 215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 215, which incorporates both mmWave antennas and sub-mmWave.

The memory circuitry 220 may include any number and type of memory devices used to provide for a given amount of system memory. As examples, the memory circuitry 220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc.

Removable memory circuitry 223 may include devices, circuitry, enclosures/housings, ports or receptacles, etc. Used to couple portable data storage devices with the platform 200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 200 may also include interface circuitry (not shown) that is used to connect external devices with the platform 200. The external devices connected to the platform 200 via the interface circuitry include sensor circuitry 221 and electro-mechanical components (EMCs) 222, as well as removable memory devices coupled to removable memory circuitry 223.

The sensor circuitry 221 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 222 include devices, modules, or subsystems whose purpose is to enable platform 200 to change its state, position, and/or orientation, or move or control a mechanism or (sub)system. Additionally, EMCs 222 may be configured to generate and send messages/signaling to other components of the platform 200 to indicate a current state of the EMCs 222.

In some implementations, the interface circuitry may connect the platform 200 with positioning circuitry 245. The positioning circuitry 245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like.

In some implementations, the interface circuitry may connect the platform 200 with Near-Field Communication (NFC) circuitry 240. NFC circuitry 240 is configured to provide contactless, short-range communications based on radio frequency identification (RFID) standards, wherein magnetic field induction is used to enable communication between NFC circuitry 240 and NFC-enabled devices external to the platform 200 (e.g., an "NFC touchpoint").

The driver circuitry 246 may include software and hardware elements that operate to control particular devices that are embedded in the platform 200, attached to the platform 200, or otherwise communicatively coupled with the platform 200. The driver circuitry 246 may include individual drivers allowing other components of the platform 200 to interact with or control various input/output (I/O) devices that may be present within, or connected to, the platform 200.

The power management integrated circuitry (PMIC) 225 (also referred to as "power management circuitry 225") may manage power provided to various components of the platform 200. In particular, with respect to the baseband circuitry 210, the PMIC 225 may control power-source selection, voltage scaling, battery charging, or DC-to-DC conversion. The PMIC 225 may often be included when the platform 200 is capable of being powered by a battery 230.

In some implementations, the PMIC 225 may control, or otherwise be part of, various power saving mechanisms of the platform 200. For example, if the platform 200 is in an RRC_Connected state, where it is still connected to the RAN node as it expects to receive traffic shortly, then it may enter a state known as Discontinuous Reception Mode (DRX) after a period of inactivity. During this state, the platform 200 may power down for brief intervals of time and thus save power. If there is no data traffic activity for an extended period of time, then the platform 200 may transition off to an RRC Idle state, where it disconnects from the network and does not perform operations such as channel quality feedback, handover, etc. The platform 200 goes into a very low power state and it performs paging where again it periodically wakes up to listen to the network and then powers down again. The platform 200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 230 may power the platform 200, although in some examples the platform 200 may be mounted deployed in a fixed location, and may have a power supply coupled to an electrical grid. The battery 230 may be a lithium ion battery, a metal-air battery, such as a zinc-air battery, an aluminum-air battery, a lithium-air battery, and the like. In some implementations, such as in V2X applications, the battery 230 may be a typical lead-acid automotive battery.

A power block, or other power supply coupled to an electrical grid may be coupled with the BMS to charge the battery 230. In some examples, a power block may be replaced with a wireless power receiver to obtain the power wirelessly, for example, through a loop antenna in the computer platform 200.

User interface circuitry 250 includes various input/output (I/O) devices present within, or connected to, the platform 200, and includes one or more user interfaces designed to enable user interaction with the platform 200 and/or peripheral component interfaces designed to enable peripheral component interaction with the platform 200.

Figure 3:
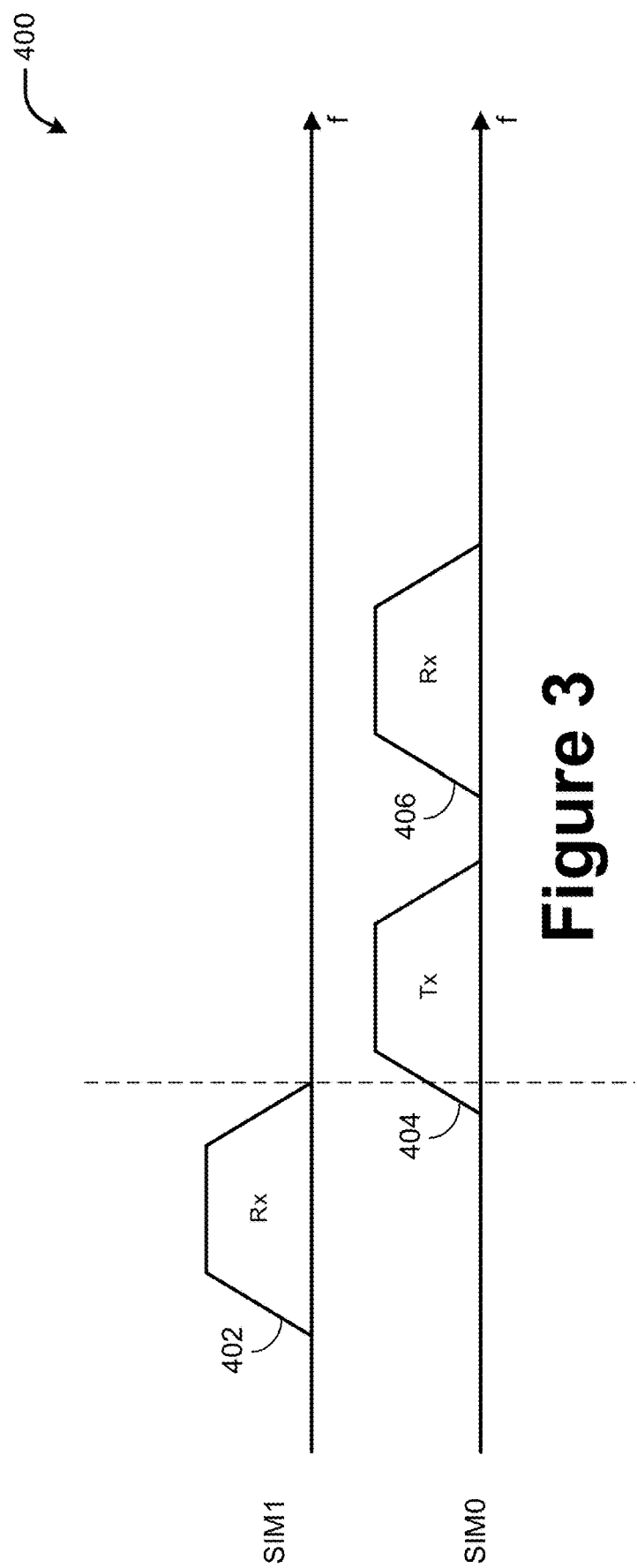
FIG. 3 illustrates an example of band conflicts for dual SIM operations.
Figure 4:
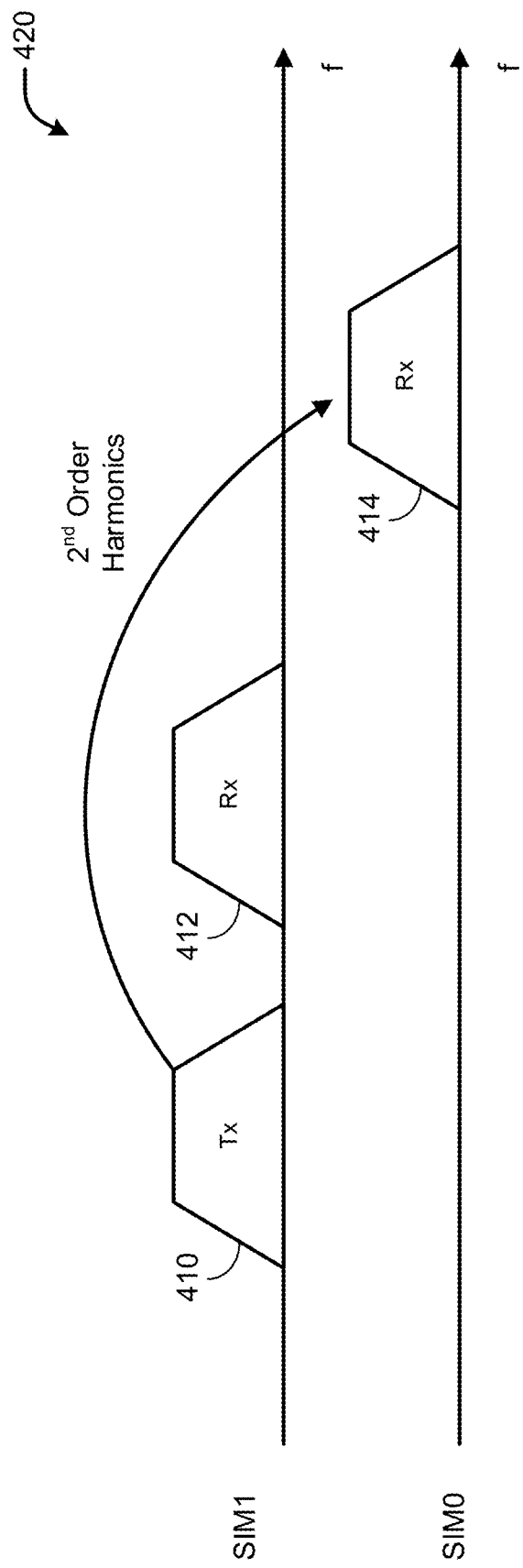
FIG. 4 illustrates an example of band conflicts for dual SIM operations.

FIGS. 3-4 show examples of band conflicts during DR-DSDS operations for a UE. The UE is configured with two SIMs, referred to as SIM1 and SIM0. In some implementations, the UE is one of the UEs 101. Scenario 400 of FIG. 3 shows an example of a Rx-Tx conflict between Rx band 402 on SIM1 and Tx band 404 on SIM0. SIM0 has a non-conflicting Rx band 406. This shows a partial overlap (e.g., in the frequency domain) of the Rx band 402 and the Tx band 404. Though a partial overlap is shown, this scenario also considers a full overlap.

Scenario 420 of FIG. 4 shows an example of a Rx-Tx conflict between Rx band 410 on SIM1 and Tx band 414 on SIM 0. In this example, the band conflict is between higher order Tx harmonics from Tx band 410 of SIM1 conflicting with the non-overlapping Rx band 414 of SIM0, causing an out-of-band interference between SIM1 and SIM0. Such interference of Rx/Tx paths can occur due to insufficient isolation between the radio frequency front end (RFFE) components (e.g., transceivers or other circuitry). In some implementations, Rx-Rx conflicts can occur as a result of a lack of RF resources. For example, there may be competition between a first and second SIM for resources on the transceiver (TRX), such as local oscillators (Los), RX chains, split low noise amplifier (LNA), ports, and so forth. In another example, there may be competition between a first and second SIM for resources in Rx paths in the RFFE.

When resolving band conflicts for DR-DSDS operations, the UE is configured to generate an RF handle based on RF configuration data available to the UE. The RF handle can include data that represents the RF hardware configuration for transmitting or receiving information by the UE with the first SIM and the second SIM. For example, the RF handle specifies which CCs and services for each SIM of the dual-SIM configuration is to use, for which bands, and for which time periods. The RF handle includes a set of CCs to be used in a given timeframe. The set of CCs (representing services to be supported) represent a given RF configuration for the UE.

The data processing system of the UE determines a priority for each CC for generation of the RF handle. The data processing system UE is configured to determine CC priority based on a cell type and a service type of each CC. For example, for CCs in a packet call, the PCELL or PSCELL has higher priority than SCELLs. As shown in Table 1 below, the priority for CCs in a packet call can use values of 0-31, each of which are lower than Idle mode activity.

TABLE 1

Example Priority Values for CCs for RF Handle Generation

| Activity and SIM State | Service Type | Priority | Comments |
| --- | --- | --- | --- |
| Rx Activity on Idle SIM | IDLE_SIM_PAGE | 68 | Paging and ETWS |
| | IDLE_SIM_ETWS_SEC | 66 | ETWS Secondary Reception |
| | IDLE_SIM_SELECTION | 62 | RSSI Scan, Cell SCAN, MIB/SIB for SLS for Cell Selection/PLMN Search shall use this priority |
| | IDLE_SIM_RESELECTION | 62 | RSSI Scan, Cell SCAN, MIB/SIB for SLS for Cell ReSelection shall use this priority |
| | IDLE_MIB_SIB | 58 | Idle MIB/SIB Read |
| | IDLE_SIM_INTRA | 56 | INTRA Frequency Search/Measure |
| | IDLE_SIM_INTER | 56 | INTER Frequency Search/Measure |
| | IDLE_SIM_IRAT | 54 | IRAT Search/Measure |
| | IDLE_SIM_NON_DRX_PAGE | 52 | Non DRX Paging used for 2G only |
| Connected SIM | SIGNAL_MSG | 70 | RACH/RRC Configuration |
| | Voice | 70 | Voice Call |
| | PCELL_DATA_CALL | 31 | PCELL Priority in Data Call |
| | PSCELL_DATA_CALL | 31 | PCELL Priority in Data Call |
| | SCELLs | 0-30 | Secondary Cells |

As seen in Table 1, service types for an Idle SIM generally have a higher priority than data communications (e.g., data messages on either the PCell or PSCell). An Idle SIM generally includes a SIM that not exchanging data or performing other operations for data transmission or reception. A connected SIM is a SIM that is performing operations for exchanging data with one or more other devices, hardware components, or systems. Idle Mode Activity refers to operations performed by an Idle SIM, such as paging, INTRA/INTER/IRAT search/measurement, MIB/SIB read operations that may result in the SIM being active. Idle SIM service have a higher priority than data messages because the UE prioritizes readiness for receiving paging requests. Data messages generally have higher priority than SCell communications. Voice and signal messages (e.g., RACH/RRC configuration messages) have the highest priority values. The priority values are associated with the entire TRx chain and are coordinated with baseband operations (e.g., by a gNB node or base station).

The UE is configured to select a mode for conflict handling when generating the RF Handle. The UE selects the mode for conflict handling depending on how much time is available for conflict resolution. In a relaxed or non-time critical timing scenario, the data processing system, which includes the RAU of the UE, is configured to perform an exhaustive search of the RF PCT. In a tight or time critical timing scenario, the data processing system of the UE is configured to perform a partial PCT search or find the first available compatible RF configuration for resolving the band conflict between the first and second SIMs.

Generally, a relaxed timing scenario includes scenarios in which an Rx or Tx timeline provides enough time for a full PCT search. An Rx or Tx timeline represents an amount of time available until the next Tx or Rx operation for one or both SIMs. A time period of the Rx or Tx timeline represents an amount of time available for the data processing system of the UE to resolve band conflicts and generate an RF handle for handling the next Rx or Tx operation(s) of the SIMs. When the timeline has enough time for the UE to resolve band conflicts, an exhaustive or full PCT search is performed so than an optimal RF handle is generated. In some implementations, the threshold time for a relaxed timeline scenario is about 3 milliseconds (ms), such that any period of time available that is greater than the threshold time allows for a full PCT search by the data processing system of the UE. In some implementations, the threshold time can be greater or less than 3 ms (e.g., 1 ms, 2 ms, 4 ms, 5 ms, and so forth).

During the relaxed timeline, an exhaustive RF PCT search is performed, as previously described. The data processing system of the UE is configured to determine whether there is a Tx-Rx conflict or an Rx-Rx band conflict for the first and second SIMS of the UE. When the data processing system of the UE determines that the conflict is Tx-Rx conflict, the data processing system of the UE is configured to generate an RF handle that drops a lower priority Tx (of a set of CCs having different priority values) conflicting with the Rx CC. For example, when there are conflicts between a packet call (a Tx CC) and an Idle CC, the Idle CC Rx has higher priority. The data processing system of the UE generates an RF handle that drops the Tx CC conflicting with Idle Rx CC. The conflicting Tx operation is delayed or otherwise set to be in an OFF state when the generated RF handle is active.

The data processing system of the UE can determine that an Rx-Rx conflict is occurring between respective operations of the first SIM and the second SIM of the UE. When there are Rx-Rx conflicts with Rx chain resource conflicts, the data processing system of the UE is configured to drop lower priority Rx CCs that conflict with the higher priority CC. The conflicting lower priority Rx CC is set to OFF when the generated handle is active. When there are Rx-Rx conflicts with a receive path (Rx path) in a receiver front-end (FE), the data processing system of the UE reduces a number of Rx paths on lower priority CCs and assign Rx paths to the higher priority Rx CC. When the generated RF handle is active, the number of Rx paths on lower priority conflicting CCs is reduced.

As previously discussed, the exhaustive PCT search is relatively time consuming in terms of computing instructions required to execute the search (e.g., taking several milliseconds). Therefore, the exhaustive search is enabled when there is enough time available (e.g., prior to the next Rx/Tx operation) to search though the PCT and generate an optimal RF configuration. When this time is not available, the data processing system of the UE is configured to perform an expedited generation of the RF handle which quickly resolves the band conflict while preserving high-priority CCs and generating the RF handle prior to the next Tx/Rx operation.

Generally, the UE can use two processes for expedited RF handle generation in a timing critical scenario. In a first example, there is only enough time to perform a single iteration of instructions for retaining or dropping Rx or Tx CCs. This process is used for generation of a temporary/transition RF handle used for a short term (e.g., to resolve the band conflict) until an optimal RF handle can be generated. In a second example, when there is not enough time for an exhaustive PCT search but there is enough time for multiple iterations of instructions for retaining or dropping Rx or Tx CCs, the data processing system of the UE is configured to drop lowest priority CCs until the remaining CC set in the RF configuration represents a compatible set of CCs that can run in parallel without band conflicts. A compatible set of CCs includes a set of CCs in which there are no band conflicts.

An example of the first scenario is now provided. In this scenario, the data processing system of the UE is configured to retain the PCell/PSCell CCs and drop remaining Rx/Tx CCs. This enables the quickest generation of the RF handle for timing critical scenarios. This can occur when, for example, a Tx request (e.g., SCell Act Req.) is received close in time to an Idle paging operation of the SIM of a UE. Here, there is no timeline to run exhaustive PCT search to get optimum DR-DSDS handle creation or to perform multiple checks of possible CC sets for generating an RF handle. In this scenario, the data processing system of the UE requests the temporary/transition RF handle that retains only the PCell/PSCell CC in a packet call for the first SIM and the Idle CC for the second SIM. The processing timeline is very short in comparison with the exhaustive PCT search. As previously discussed, the data processing system of the UE generates the temporary RF handle in this first scenario when there is not enough timeline to run exhaustive PCT search for upcoming DR-DSDS activity. The data processing system of the UE requests an optimum DR-DSDS RF handle that drops only conflicting CCs in a non-timing-critical context. The optimum RF handle is then used when the Idle SIM has activity again.

An example of the second scenario is now provided. In this scenario, the data processing system of the UE provides SCell priority based on signal condition metrics including but not limited SNR/RSRP/RSSI and energy efficiency metrics including but not limited to Tput/Power ratio. Instead of running an exhaustive PCT search, the UE is configured to drop a lowest priority CC when the requested RF configuration has band conflicts. The data processing system is configured to iterate this process with the remaining set of CCs until the RF configuration is compatible for requested Rx/Tx operations. If the PCELL of two SIMS conflict with each other, the PCELL with higher priority remains, and SR-DSDS is utilized. In a given example, 2nd order harmonics Tx of Band 8 conflict with Band 3 Rx, 3rd order harmonics Tx of Band 8 can conflict with Band 38 Rx. To resolve the band conflict, in this second scenario, the lower priority conflicting CC is dropped, and this process is repeated until a band combination is found without any conflicts. For this second scenario, the consumption of computing resources is less than for an exhaustive PCT search, and the timing for RF handle generation is generally less than the exhaustive PCT search. The timing may be longer and the amount of computing resources consumed may be greater than for the first scenario, though a better quality RF handle is generated.

Similar to the first scenario, the second scenario is performed by the data processing system of the UE for generating a temporary RF handle when there is not time to perform the exhaustive PCT search. The data processing system of the UE requests an optimum DR-DSDS handle that drops only conflicting CCs during a next non-time-critical context. The optimal RF handle is then used when the Idle SIM has activity again.

For scenarios including SCell band conflicts, the data processing system of the UE causes the UE to switch to a standalone RF handle for packet call operations having full capacity support when the Idle SIM is not active. When the Idle SIM becomes active, the UE is configured to switch to the DR-DSDS RF handle with reduced capacity support for packet call operations. This removes conflicting Rx CCs or Tx CCs, or reduces conflicting Rx CC Rx paths.

For scenarios including PCell conflicts between two SIMS, the data processing system causes the UE to operate using a legacy SR-DSDS configuration. For example: NR TDD band 258 is not compatible with 2G/3G. If one SIM is in NR TDD band 258, and the other SIM is in 2G/3G, then the UE utilizes a legacy SR-DSDS mode. The packet call is suspended by the UE when the Idle SIM becomes active. The packet call is then resumed after the Idle SIM in phase-quadrature (I/Q) streaming activity for the otherwise Idle SIM is completed. If there are no band conflicts detected, the UE retrieves or generates an RF handle with full DR-DSDS support. The UE is configured to stay on that handle to avoid potential RF interference due to a handle switch.

Figure 5:
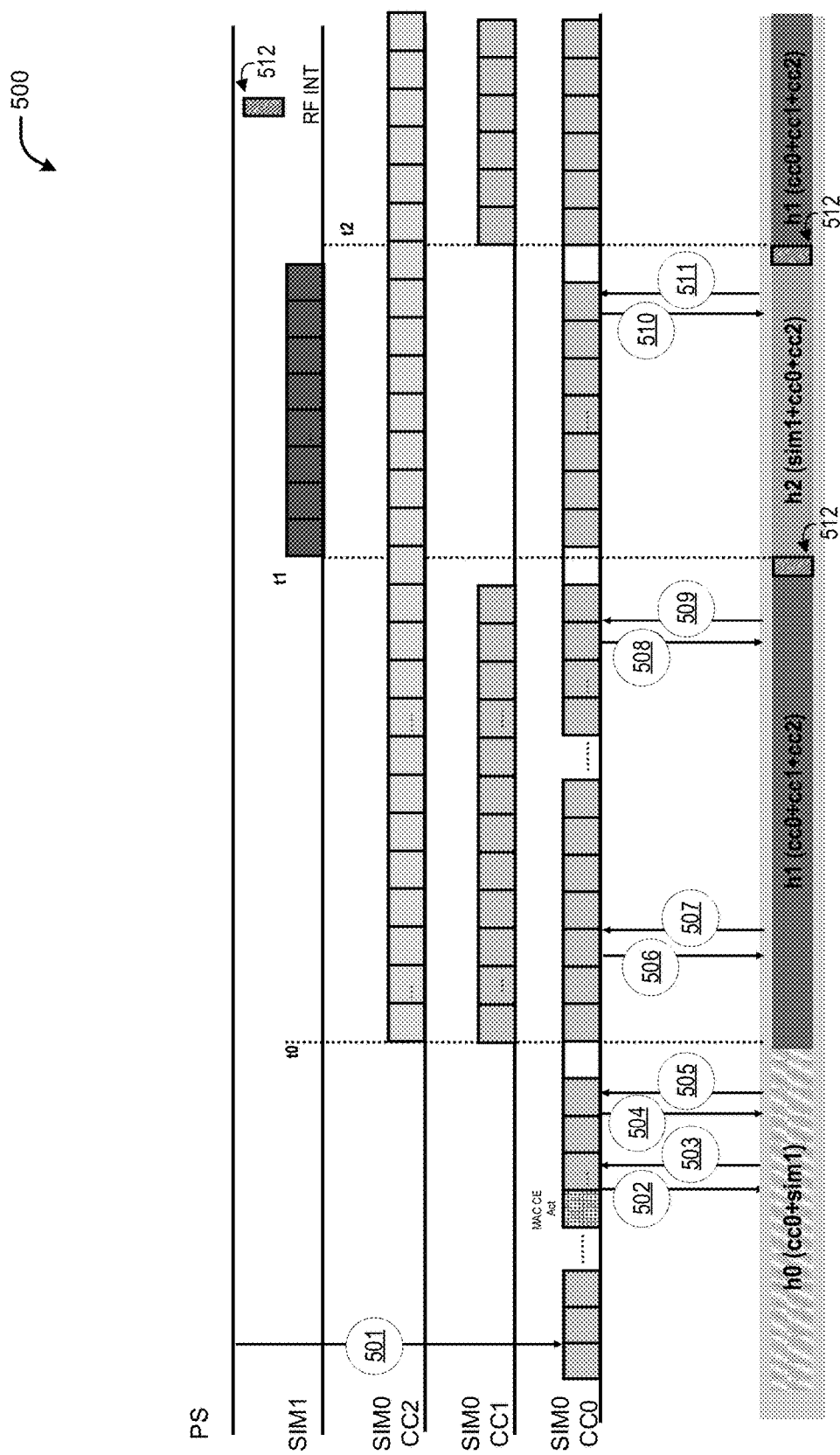
FIG. 5 illustrates an example scenario for DR-DSDS band conflict RF handle generation for a relaxed or non-critical timeline.

FIG. 5 illustrates a timing diagram 500 representing an example scenario for DR-DSDS band conflict RF handle generation for a relaxed or non-critical timeline. In scenario 500, the SIM0 is initially in a packet call with $CC_0$ only. SIM1 is in an Idle mode. The UE stays on DR-DSDS RF handle $h_0$ (e.g., $CC_0$+SIM1) until $t_0$. The UE prepares a standalone RF handle $h_1$ for $CC_0$+$CC_1$+$CC_2$ upon receiving an instruction SCELL_ADD REQ shown at message 501. When the SIM0 receives a MAC CE command to activate $CC_1$ and $CC_2$, the UE switches to RF handle $h_1$ for the SCELL Act operation. The SIM0 is configured to send message 502 to the RAU specifying an RF handle request for $CC_0$+$CC_1$. The message 503 is received in response, indicating that the RF handle is configured in accordance with $h_1$. The data processing system of the UE then sends a request in message 504 indicating that the RAU switch the RF handle to $h_1$ from $h_0$. A message 505 is received in response indicating that the RF handle to be switched at $t_0$ so that the RF configuration is in accordance with $h_1$ at $t_0$.

The UE is configured to check how far away in time the SIM1 paging operation is when resolving the band conflict at to. The SIM1 paging operation is far enough away in time (e.g., $t_1$) such that the UE is configured to request, in message 506, an optimum DR-DSDS RF handle for SIM0+SIM1 using an exhaustive PCT search, as previously described. The data processing system of the UE receives, in a response message 507, the RF handle $h_2$ that includes SIM1+SIM0 $CC_0$+SIM0 $CC_2$. This configuration is used because $CC_1$ conflicts with the SIM1 Idle CC.

The UE switches to RF handle $h_2$ when the Idle activity of SIM1 occurs at $t_1$. This occurs with message 508 specifying the RF switch at time $t_2$ to the RAU (e.g., RF_HANDLE_SWITCH_REQ(h2, t1)). The UE receives a response in message 509 indicating that the RF configuration is to switch at t1 as requested (e.g., RF_HANDLE_SWITCH_CNF(h2, t1)).

After the Idle SIM1 activity is complete (or when it is nearing completion) at $t_2$, the UE is configured to request a switch back to standalone RF handle $h_1$, shown in message 510 (e.g., RF_HANDLE_SWITCH_REQ((h1, t2)). The data processing system of the UE receives a response in message 511 confirming that the RF configuration is switching at $t_2$ (e.g., RF_HANDLE_SWITCH_CNF(h1, t2)). Depending on the RF configuration, the handle switch can potentially cause RF INT(Interruption). In case of RF INT, the INT slot 512 is to be blanked.

Figure 6:
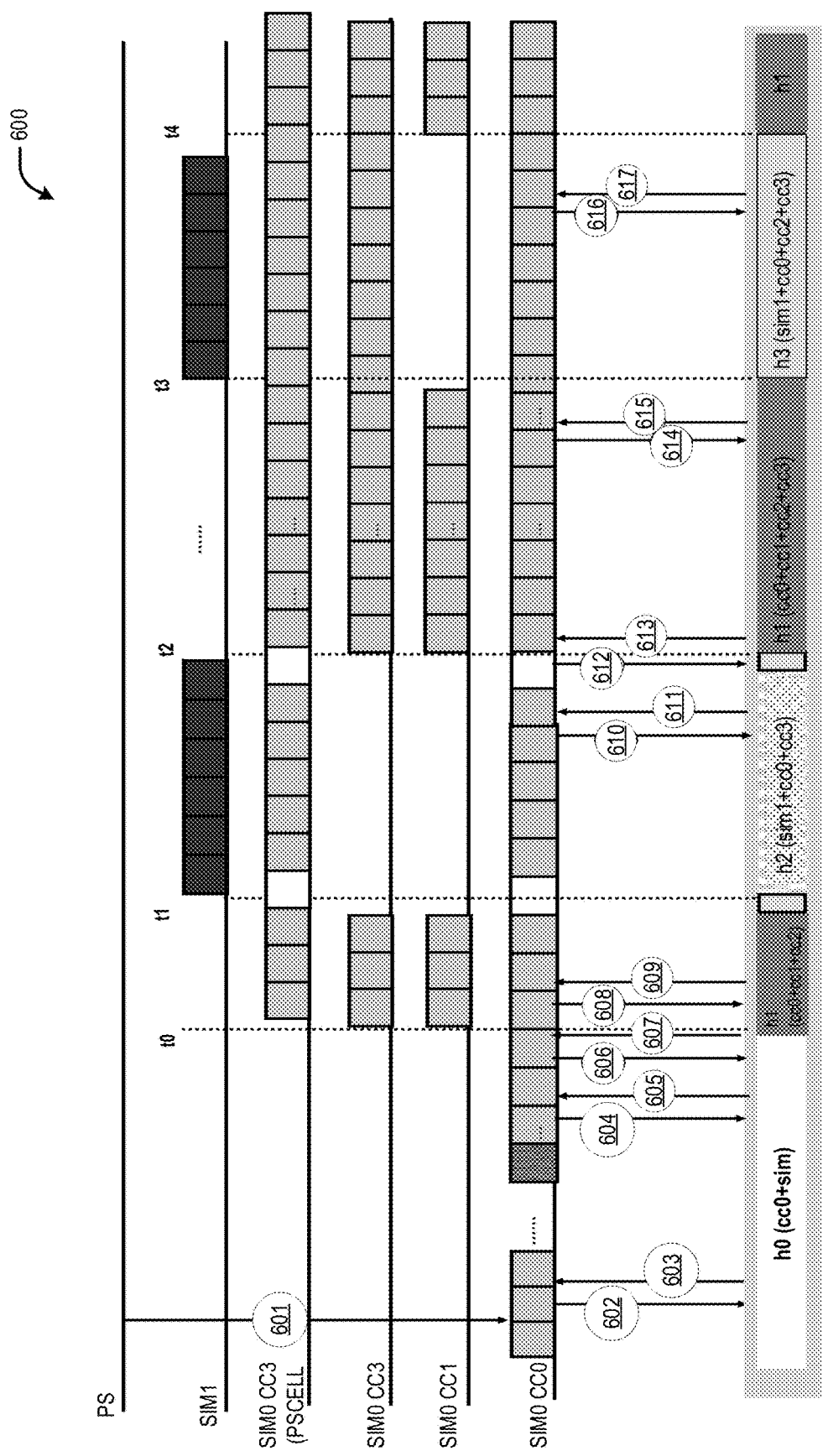
FIG. 6 illustrates an example scenario for DR-DSDS band conflict RF handle generation for a tight or time-critical timeline.

FIG. 6 illustrates a timing diagram 600 showing an example scenario for DR-DSDS band conflict RF handle generation for a tight or time-critical timeline. As shown in the timing diagram 600, SIM0 of the UE is initially in a packet call including $CC_0$ only, and SIM1 is Idle. The UE is using RF handle $h_0$ ($CC_0$+SIM1). The UE has generated a standalone RF handle $h_1$ for $CC_0$+$CC_1$+$CC_2$+$CC_3$ when receiving a request to add SCell (e.g., SCELL_ADD REQ). The UE receives a MAC CE command in message 601 to activate $CC_1$, $CC_2$, and $CC_3$ (e.g. SCELL_ADD(cc1+cc2+cc3)), where $CC_3$ is a PSCell. The UE requests a switch at $t_0$ in message 604 to $h_1$ for the SCell action. This is performed by requesting a handle for $CC_0$+$CC_1$+$CC_2$ in message 602 (e.g., RF_HANDLE_REQ(cc0+cc1+cc2)). The RAU responds with the RF configuration in message 603 (e.g., RF_HANDLE_CNF(h1)). When the MAC CE is received, the UE requests from the RAU in message 604 to switch the RF handle at a given time to (e.g., RF_HANDLE_SWITCH_REQ($h_1$, $t_0$)). The RAU responds with the confirmation message 605 (e.g., RF_HANDLE_SWITCH_CNF($h_1$, $t_0$)).

Because SIM paging operations are close in time, $t_1$ is close to $t_0$, as shown in timing diagram 600, and the UE requests an RF handle for DR-DSDS for SIM0+SIM1 using the first tight timing scenario previously described. The UE request is in message 606 (e.g., RF_HANDLE_REQ(sim0+sim1, mode1), where mode1 refers to timing scenario 1). At this point, the data processing system of the UE checks the time margin available. If an available time margin is longer than a timeline needed for incremental CC drop in the second scenario, but shorter than that of exhaustive PCT search, the UE uses the mode in the second scenario previously described. The UE receives a response in message 607 (e.g., RF_HANDLE_CNF(h2, sim1+cc0+cc3)) including the RF handle $h_2$ specifying the RF configuration including SIM1+$CC_0$+$CC_3$. The UE switches to $h_2$ when the Idle activity time $t_1$ is due. The UE sends message 608 (e.g., RF_HANDLE_SWITCH_REQ((h2, t1)) to the RAU requesting the switch from RF handle $h_1$ to RF handle $h_2$ at time $t_1$. The UE receives a response in message 609 (e.g., RF_HANDLE_SWITCH_CNF($h_2$, $t_1$)) confirming the switch at time $t_1$.

When there is no timeline to acquire a new DR-DSDS RF handle, the existing RF handle $h_0$ is selected by the UE for the upcoming Idle activity for SIM1 at time $t_1$. The UE switches back to standalone handle h1 after Idle activity is done. This is shown by message 610 (e.g., RF_HANDLE_SWITCH_REQ((h1, t2)) requesting the switch and response message 611 (e.g., RF_HANDLE_SWITCH_CNF(h1, t2)) confirming the switch to RF handle h1 at time $t_2$, when idle activity for SIM1 is completed.

After the idle activity is complete for SIM1, the UE determines that there is enough time before the next RF handle switch prior to SIM1 idle operations at $t_3$. The UE requests in message 612 (e.g., RF_HANDLE_REQ(sim0+sim1, mode0)) the optimum DR-DSDS handle $h_3$, which is generated using the non-timing-critical scenario previously described (also called mode0). The RF handle h3 generation finds and drops conflicting $CC_1$. The response to the UE request is included in message 613 (e.g., RF_HANDLE_CNF(h2, sim1+cc0/2/3)) which specifies the updated RF configuration.

Prior to time $t_3$, the UE requests a switch to h3 at time $t_3$ in message 614 (e.g., RF_HANDLE_SWITCH_REQ((h3, $t_3$)) for when the next Idle paging operation is due (e.g., at time $t_3$). Confirmation message 615 (e.g., RF_HANDLE_SWITCH_CNF(h3, t3) confirming the RF configuration for $t_3$ is received by the UE in response to the request. The UE then is configured to switch back to $h_1$ after paging operations for SIM1 are completed at time t4. This switch is shown by request from the UE in message 616 (e.g., RF_HANDLE_SWITCH_REQ((h1, t4)) requesting the switch to $h_1$ at time $t_4$, and the confirmation message 617 response (e.g., RF_HANDLE_SWITCH_CNF(h1, t4)).

Figure 7:
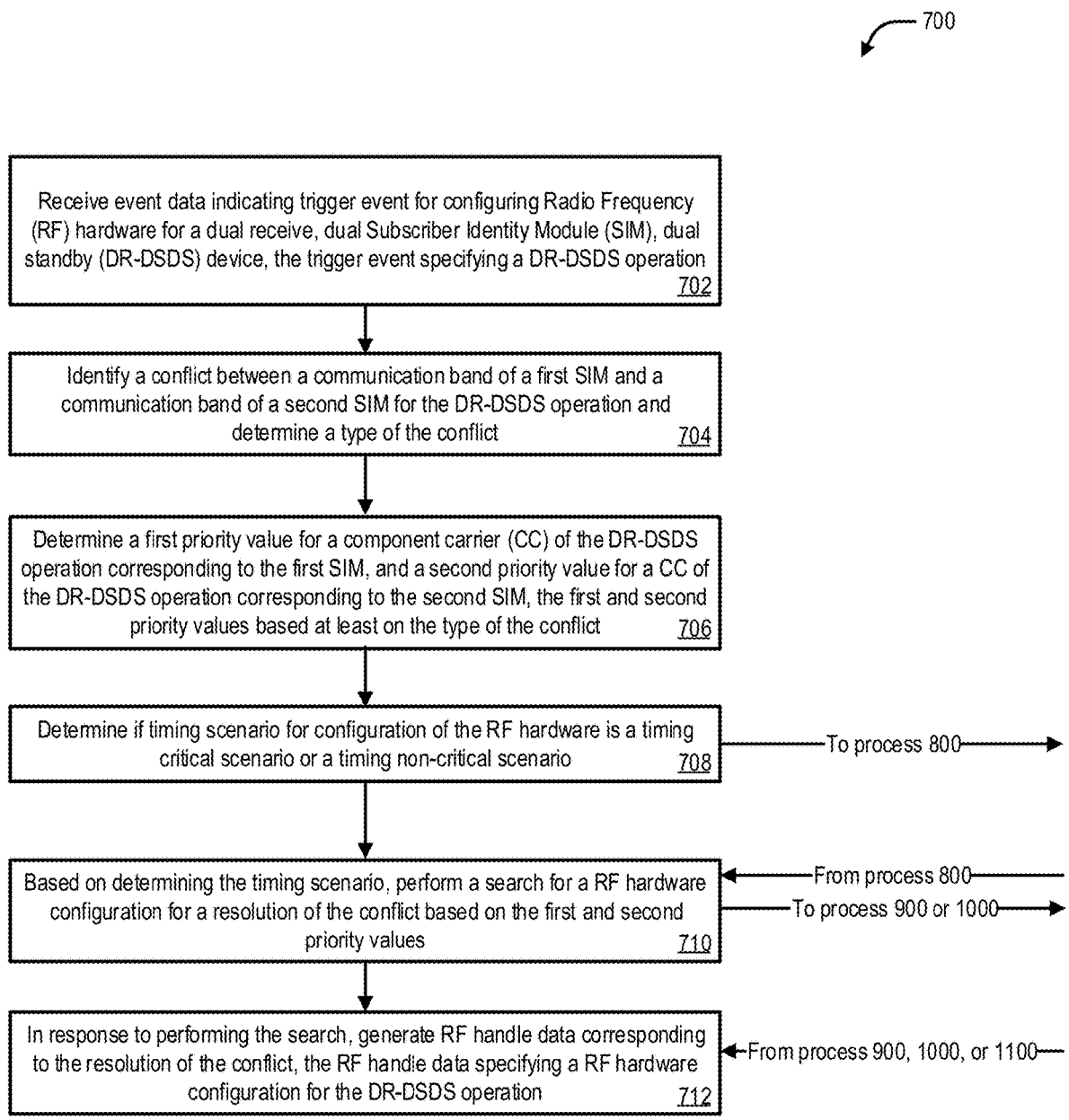
FIG. 7 illustrates an example process for determining a timeline for band conflict resolution for a DR-DSDS scenario in accordance with some implementations of the present disclosure.

FIG. 7 illustrates an example process 700 for determining a timeline for band conflict resolution for a DR-DSDS scenario in accordance with some implementations of the present disclosure. In some implementations, the process 700 is performed by a data processing system of an UE, for example, one of the UEs 101. In some implementations, the data processing system that performs the process 700 includes the RAU. Accordingly, in the following sections, the process 700 is described with respect to the data processing system of an UE as described with respect to FIGS. 1-6. However, the process 700 can also be performed by other UEs.

UE is configured to receive (702) event data indicating trigger event for configuring RF hardware for a DR-DSDS device, the trigger event specifying a DR-DSDS operation. For example, as previously described in relation to FIGS. 4-6 above, the trigger event can include events like download channel or transmit channel start, Inter Radio Access Technology (IRAT) or inter frequency (IFREQ) measurement, dynamic RxD, best transmitter antenna selection, MAC control element (CE) SCell activate or deactivate messages, downlink control information (DCI) decoded bandwidth part (BWP) switch request messages, and so forth.

The UE is configured to identify (704) a conflict between a communication band of a first SIM and a communication band of a second SIM for the DR-DSDS operation and determine a type of the conflict. For example, in some cases, determining the type of the conflict can include determining that the conflict includes a Pcell-PScell conflict between the first SIM and the second SIM. In that case, the UE suspends a packet call when an Idle SIM, of the first SIM and the second SIM, is prepared for paging operations resumes the packet call when I/Q streaming activity of the Idle SIM is completed.

The UE is configured to determine (706) a first priority value for a component carrier (CC) of the DR-DSDS operation corresponding to the first SIM, and a second priority value for a CC of the DR-DSDS operation corresponding to the second SIM, the first and second priority values based at least on the type of the conflict. The UE is configured to determine (708) if a timing scenario for configuration of the RF hardware configuration is a timing critical scenario or a timing non-critical scenario. Based on determining the timing scenario, described in relation to FIG. 8 below, the UE performs (710) a search for a RF hardware configuration for a resolution of the conflict based on the first and second priority values. The UE is configured, in response to performing the search, to generate (712) the RF handle data corresponding to the resolution of the conflict, the RF handle data specifying a RF hardware configuration for the DR-DSDS operation.

Figure 8:
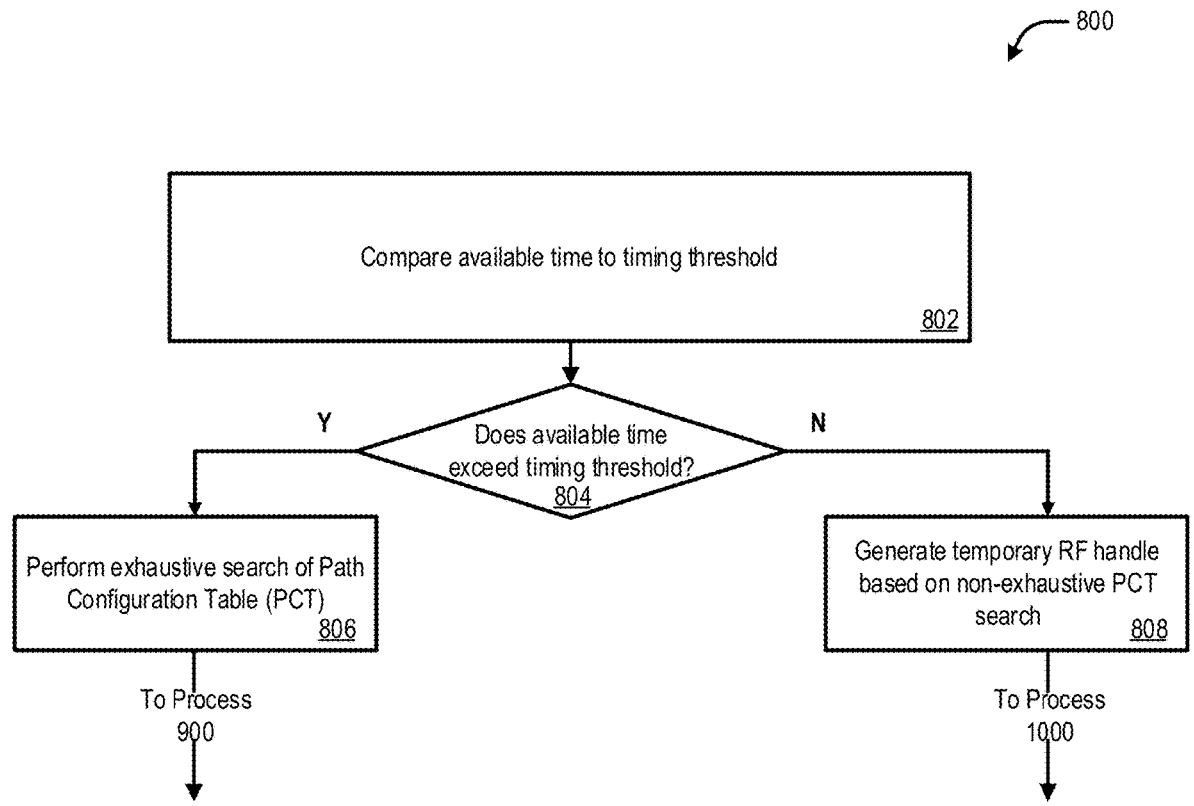
FIG. 8 illustrates an example process for determining a timeline for DR-DSDS band conflict RF handle generation in accordance with some implementations of the present disclosure.

FIG. 8 illustrates an example process 800 for determining a timeline for DR-DSDS band conflict RF handle generation in accordance with some implementations of the present disclosure. In some implementations, the process 800 is performed by a data processing system of an UE, for example, one of the UEs 101. In some implementations, the data processing system that performs the process 800 includes the RAU. Accordingly, in the following sections, the process 800 is described with respect to the data processing system of an UE as described with respect to FIGS. 1-6. However, the process 800 can also be performed by other UEs. The UE is configured to compare (802) available time before the RF switch is needed to a timing threshold. For example, the RF switch can be needed for handling Idle SIM paging operations. The timing threshold value is determined based on how much time is needed for performing a full PCT search and configuration of the RF handle responsive to the search. In summary, if a timing margin available is greater than a time for performing a full PCT search, the UE performs the full PCT search. Else, if the timing margin available is greater than that needed for timing scenario two, the UE performs timing scenario two. Else, if the margin available is greater than that needed for timing scenario 1, the UE uses timing scenario 1. Otherwise use available DR-DSDS handle or fall back to SR-DSDS if DR-DSDS handle is not available The UE determines (804) if the available time exceeds a threshold amount of time for performing the exhaustive PCT search. For example, the UE checks when a paging operation is scheduled for the Idle SIM. If the amount of time available exceeds the time needed for an exhaustive PCT search, the UE is configured to perform (806) the exhaustive PCT search (e.g., as previously described and described in relation to FIG. 9). For example, the UE is configured to find an optimal hardware configuration for the first and second SIMS. If the time available does not exceed the threshold time known to be needed for an exhaustive or full PCT search, the UE is configured to perform (808) a timing-critical process (e.g., as previously described and described in relation to FIG. 10). For example, the time threshold can include 1-5 ms.

Figure 9:
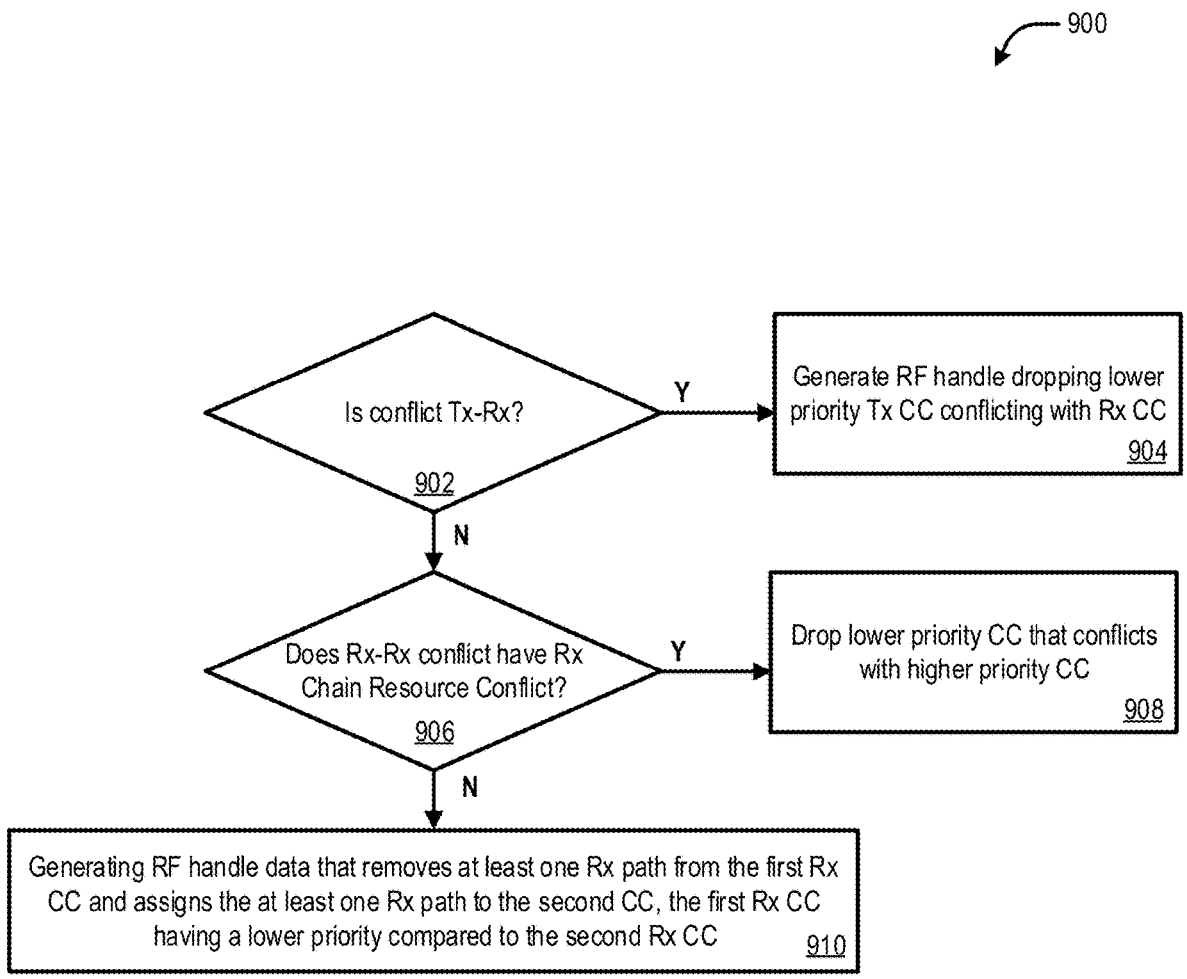
FIG. 9 illustrates an example process for DR-DSDS band conflict RF handle generation for a relaxed timeline in accordance with some implementations of the present disclosure.

FIG. 9 illustrates an example process 900 for DR-DSDS band conflict RF handle generation for a relaxed timeline in accordance with some implementations of the present disclosure. In some implementations, the process 900 is performed by a data processing system of an UE, for example, one of the UEs 101. In some implementations, the data processing system that performs the process 900 includes the RAU. Accordingly, in the following sections, the process 900 is described with respect to the data processing system of an UE as described with respect to FIGS. 1-6. However, the process 900 can also be performed by other UEs. The UE determines (902) whether the conflict is a Tx-Rx conflict type. If the conflict is a Tx-Rx conflict type, the UE is configured to generate (904) RF handle dropping lower priority Tx CC conflicting with Rx CC. For example, the UE can drop a data CC for a voice CC. If the conflict type is a Rx-Rx conflict type, the UE determines (906) whether the Rx-Rx conflict has a Rx chain resource conflict. For example, the UE checks to determine if any common resource in the Rx chain has a conflict. If there is a Rx chain resource conflict, the UE is configured to drop (908) a lower priority CC than conflicts with another CC having a higher priority than the lower priority CC. If there is no Rx chain resource conflict, the UE is configured to generate (910) RF handle data that removes at least one Rx path from the first Rx CC and assigns the at least one Rx path to the second CC, the first Rx CC having a lower priority compared to the second Rx CC.

Figure 10:
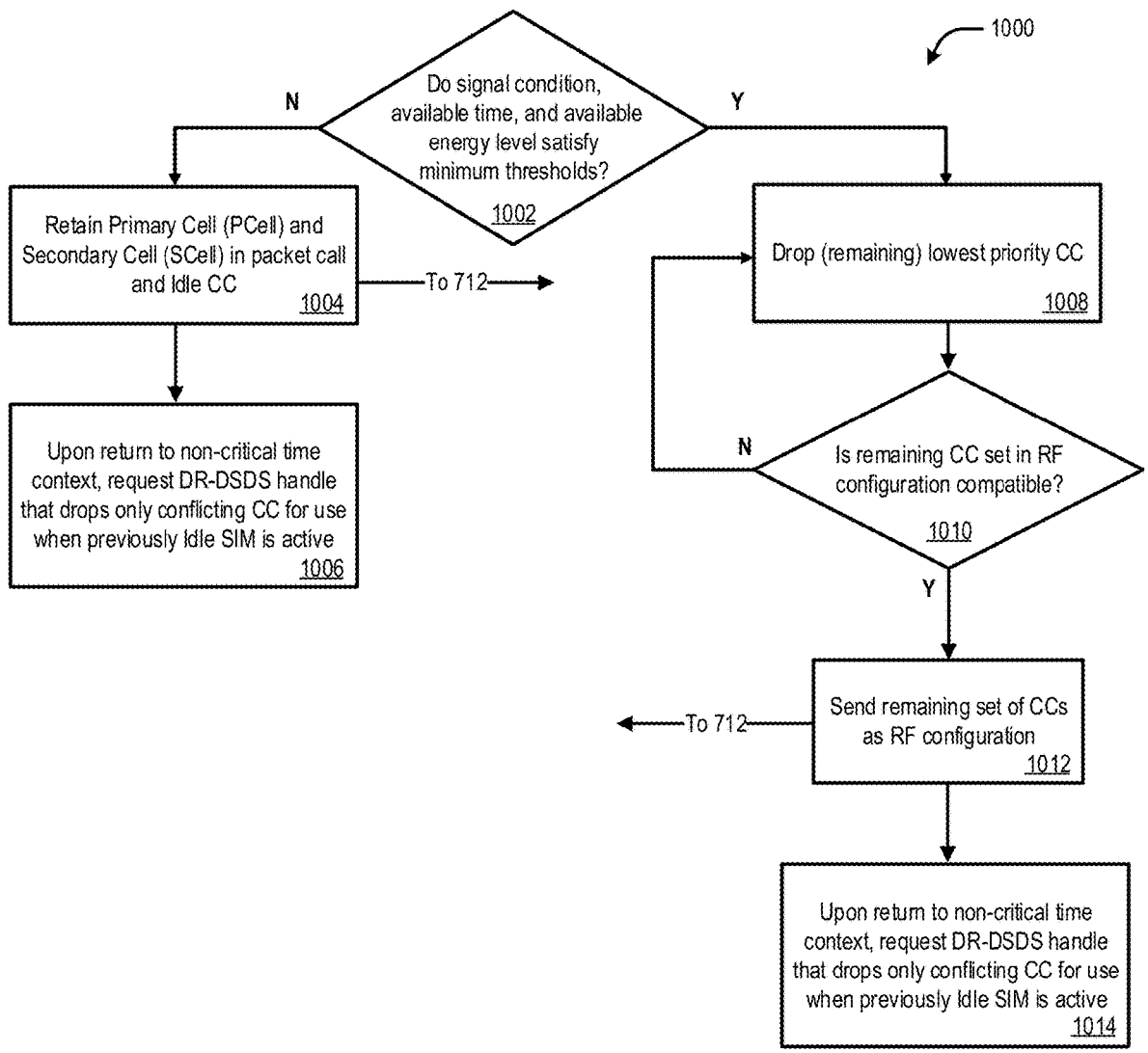
FIG. 10 illustrates an example process for DR-DSDS band conflict RF handle generation for a tight timeline in accordance with some implementations of the present disclosure.

FIG. 10 illustrates an example process 1000 for DR-DSDS band conflict RF handle generation for a tight timeline in accordance with some implementations of the present disclosure. In some implementations, the process 1000 is performed by a data processing system of an UE, for example, one of the UEs 101. In some implementations, the data processing system that performs the process 1000 includes the RAU. Accordingly, in the following sections, the process 1000 is described with respect to the data processing system of an UE as described with respect to FIGS. 1-6. However, the process 1000 can also be performed by other UEs. The UE is configured to determine (1002) if signal condition metrics including but not limited SNR/RSRP/RSSI, and energy efficiency metrics including but not limited to Tput/Power ratio, satisfy minimum thresholds. If the minimum thresholds are not satisfied, the UE is configured to retain (1004) Primary Cell (PCell) and Secondary Cell (SCell) data in a packet call CC and also the Idle CC for conflict resolution. The UE then proceeds to generate the RF handle including these CCs in accordance with process 700. The UE is configured to request (1006), upon return to a non-critical time context, a DR-DSDS handle that drops only conflicting CC for use when previously Idle SIM is active.

If the UE determines that the minimum thresholds for the signal and timing metrics are not met in the given timing scenario, the UE is configured to drop (1008) a lowest priority CC that is in the set of CCs. If the remaining CCs in the set for the RF handle are not compatible, the UE drops the next lowest (or remaining lowest) priority CC until (1010) a compatible set of CCs for the RF handle is obtained. Once the set of compatible CCs is obtained, the UE sends (1012) the set of remaining CCs to the RF configuration for generating of the RF handle in accordance with process 700. The UE is configured to request (1014), upon return to a non-critical time context, a DR-DSDS handle that drops only conflicting CC for use when previously Idle SIM is active.

Figure 11A:
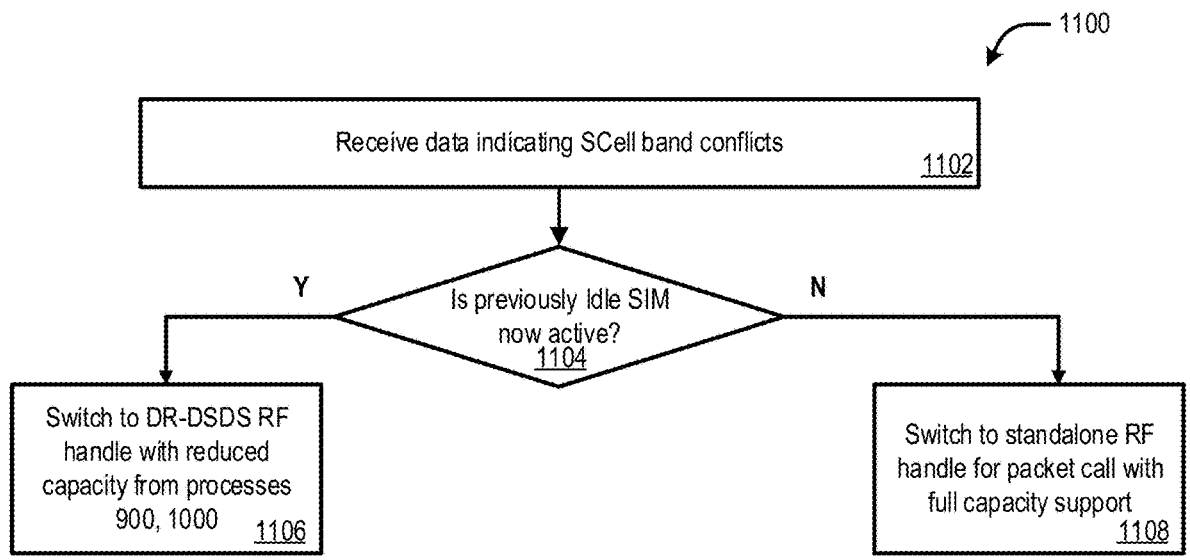
FIGS. 11A-11B illustrate example processes for DR-DSDS band conflict RF handle generation.
Figure 11B:
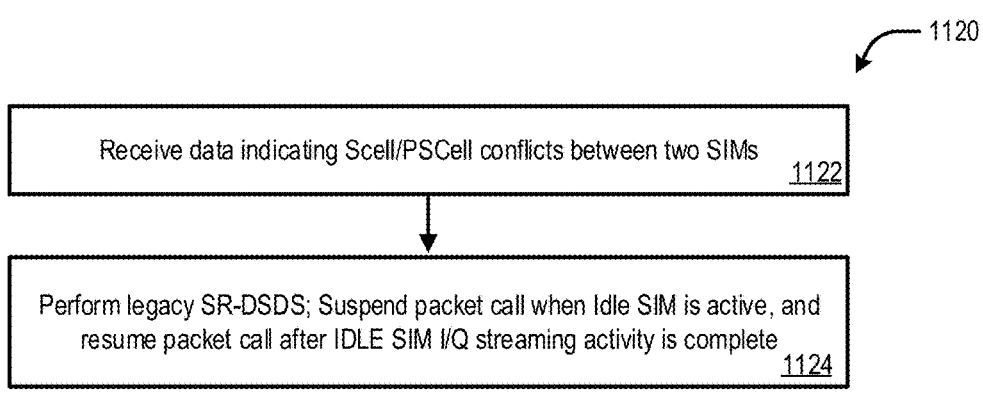

FIGS. 11A-11B illustrate example processes 1100, 1120 for DR-DSDS band conflict RF handle generation. In some implementations, the process 1100 or 1120 is performed by a data processing system of an UE, for example, one of the UEs 101. In some implementations, the data processing system that performs the process 1100 or 1120 includes the RAU. Accordingly, in the following sections, the process 1100 or 1120 is described with respect to the data processing system of an UE as described with respect to FIGS. 1-6. However, the process 800 can also be performed by other UEs. For process 1100 of FIG. 11A, the UE is configured to receive (1102) data indicating SCell band conflicts. The UE determines (1104) if a previously idle SIM is now active. If the previously idle SIM is active, the UE is configured to switch (1106) to DR-DSDS RF handle with reduced capacity as described in relation to processes 900, 1000 and FIG. 6. If the previously idle SIM is not active, the UE is configured to switch (1108) to a standalone RF handle for packet call with full capacity support, as previously described.

FIG. 11B shows a process 1120 for DR-DSDS band conflict RF handle generation. The UE is configured to receive (1122) data indicating Scell/PSCell conflicts between two SIMS. In this scenario, the UE performs (1124) a legacy SR-DSDS operation. The UE suspends a packet call when the Idle SIM becomes active, and resumes the packet call after the Idle SIM I/Q streaming activity is completed.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

EXAMPLES

In the following sections, further exemplary embodiments are provided.

Example 1 includes a method performed by user equipment (UE), the method comprising: receiving event data indicating a trigger event configuring radio frequency (RF) hardware for a dual-receive, dual subscriber identity module (SIM) dual standby (DR-DSDS) operation by the UE; identifying a conflict between a communication band of a first SIM and a communication band of a second SIM for the DR-DSDS operation; determining a type of the conflict; upon determining the type of the conflict, determining, a first priority value for a component carrier (CC) of the DR-DSDS operation corresponding to the first SIM, and a second priority value for a CC of the DR-DSDS operation corresponding to the second SIM, the first and second priority values based at least on the type of the conflict; determining a timing scenario for configuring the RF hardware; based on determining the timing scenario, performing a search for a RF hardware configuration for a resolution of the conflict based on the first and second priority values; and in response to performing the search, generating RF handle data corresponding to the resolution of the conflict, the RF handle data specifying a RF hardware configuration for the DR-DSDS operation.

Example 2 includes a method of example 1 or some other example herein, wherein determining the timing scenario for configuring the RF hardware and performing the search based on determining the timing scenario comprises: determining an amount of time between the trigger event and a next idle activity of the first SIM or the second SIM; comparing the amount of time to a threshold amount of time; based on the comparison, performing one of a non-exhaustive path configuration table (PCT) search or an exhaustive PCT search, comprising: when the amount of time exceeds the threshold amount of time, generating the RF handle data based on the non-exhaustive PCT search; and when the amount of time does not exceed the threshold amount of time, generating the RF handle data based on the exhaustive PCT search.

Example 3 includes a method of example 2 or some other example herein, wherein generating the RF handle data based on the exhaustive PCT search comprises: determining that the type of the conflict comprises a transmit (Tx) CC on the first SIM that conflicts with a receive (Rx) CC on the second SIM; and based on the determining, generating RF handle data that drops the Tx CC that conflicts with the Rx CC.

Example 4 includes a method of examples 2-3 or some other example herein, wherein generating the RF handle data based on the exhaustive PCT search comprises: determining that the type of the conflict comprises a first Rx CC on the first SIM and a second Rx CC on the second SIM and that the conflict comprises a Rx chain resource conflict; and based on the determining, generating RF handle data that removes at least one Rx path from the first Rx CC and assigns the at least one Rx path to the second CC, the first Rx CC having a lower priority compared to the second Rx CC.

Example 5 includes a method of examples 2-4 or some other example herein, wherein generating the RF handle data based on the non-exhaustive PCT search comprises: determining that the amount of time exceeds a minimum time threshold; based on the determining, receiving data specifying a signal condition level; determining that the signal condition level satisfies a threshold signal condition level; in response to determining that the signal condition level satisfies the threshold signal condition level, dropping a CC that has a lowest priority of a set of CCs from the RF handle data; confirming, in response to dropping the CC having the lowest priority from the RF handle data, that a remaining set of CCs represent a compatible RF handle in which the first SIM and second SIM operate in parallel without band conflicts; and generating, based on the confirming, the RF handle data that comprises the remaining set of CCs.

Example 6 includes a method of examples 2-5 or some other example herein, wherein generating the RF handle data based on the non-exhaustive PCT search comprises: determining that the amount of time exceeds a minimum time threshold; based on the determining, receiving data specifying a signal condition level; determining that the signal condition level does not satisfy a threshold signal condition level; in response to determining that the signal condition level does not satisfy the threshold signal condition level, retaining (i) primary cell (PCell) data and (ii) primary cell of a secondary cell group (PSCell) data in a packet call; and generating the RF handle data comprising a first CC for the first SIM representing an Idle operation and a second CC for the second SIM, the second CC including the PCell data and the PSCell data for the second SIM.

Example 7 includes a method of examples 2-6 or some other example herein, wherein the threshold amount of time is determined based on timing of one or more paging operations of the first SIM or the second SIM.

Example 8 includes a method of examples 1-7 or some other example herein, comprising: receiving conflict data specifying at least one SCell band conflict for the first SIM; determining, in response to receiving the conflict data, that the second SIM is not active; and generating RF handle data specifying a packet call having full capacity support including all CCs.

Example 9 includes a method of examples 1-8 or some other example herein, comprising: receiving conflict data specifying at least one SCell band conflict for the first SIM; determining, in response to receiving the conflict data, that the second SIM is active; and generating RF handle data specifying a packet call having reduced capacity support by removing at least one of a conflicting Rx CC, a conflicting Tx CC, or a conflicting Rx CC Rx path.

Example 10 includes a method of examples 1-9 or some other example herein, wherein determining a type of the conflict comprises: determining that the conflict includes a Pcell-PScell conflict between the first SIM and the second SIM; determining that one of the first SIM or the second SIM is idle; suspending a packet call when one of the first SIM or the second SIM that is idle is prepared for paging operations that include a streaming activity; and resuming the packet call when the streaming activity is completed.

Example 11 includes a user equipment (UE) comprising: a first subscriber identity module (SIM); a second SIM; radio frequency (RF) hardware; and at least one processor in communication with the first SIM, the second SIM, and the RF hardware, the at least one processor configured to perform operations comprising: receiving event data indicating a trigger event configuring the RF hardware for a dual-receive, dual-SIM dual standby (DR-DSDS) operation; identifying a conflict between a communication band of the first SIM and a communication band of the second SIM for the DR-DSDS operation; determining a type of the conflict; upon determining the type of the conflict, determining, a first priority value for a component carrier (CC) of the DR-DSDS operation corresponding to the first SIM, and a second priority value for a CC of the DR-DSDS operation corresponding to the second SIM, the first and second priority values based at least on the type of the conflict; determining a timing scenario for configuring the RF hardware; based on determining the timing scenario, performing a search for a RF hardware configuration for a resolution of the conflict based on the first and second priority values; and in response to performing the search, generating RF handle data corresponding to the resolution of the conflict, the RF handle data specifying a RF hardware configuration for the DR-DSDS operation.

Example 12 includes a UE of example 11 or some other example herein, wherein determining the timing scenario for configuring the RF hardware and performing the search based on determining the timing scenario comprises: determining an amount of time between the trigger event and a next idle activity of the first SIM or the second SIM; comparing the amount of time to a threshold amount of time; based on the comparison, performing one of a non-exhaustive path configuration table (PCT) search or an exhaustive PCT search, comprising: when the amount of time exceeds the threshold amount of time, generating the RF handle data based on the non-exhaustive PCT search; and when the amount of time does not exceed the threshold amount of time, generating the RF handle data based on the exhaustive PCT search.

Example 13 includes the UE of example 12 or some other example herein, wherein generating the RF handle data based on the exhaustive PCT search comprises: determining that the type of the conflict comprises a transmit (Tx) CC on the first SIM that conflicts with a receive (Rx) CC on the second SIM; and based on the determining, generating RF handle data that drops the Tx CC that conflicts with the Rx CC.

Example 14 includes a UE of examples 12-13 or some other example herein, wherein generating the RF handle data based on the exhaustive PCT search comprises: determining that the type of the conflict comprises a first Rx CC on the first SIM and a second Rx CC on the second SIM and that the conflict comprises a Rx chain resource conflict; and based on the determining, generating RF handle data that removes at least one Rx path from the first Rx CC and assigns the at least one Rx path to the second CC, the first Rx CC having a lower priority compared to the second Rx CC.

Example 15 includes a UE of examples 12-14 or some other example herein, wherein generating the RF handle data based on the non-exhaustive PCT search comprises: determining that the amount of time exceeds a minimum time threshold; based on the determining, receiving data specifying a signal condition level; determining that the signal condition level satisfies a threshold signal condition level; in response to determining that the signal condition level satisfies the threshold signal condition level, dropping a CC that has a lowest priority of a set of CCs from the RF handle data; confirming, in response to dropping the CC having the lowest priority from the RF handle data, that a remaining set of CCs represent a compatible RF handle in which the first SIM and second SIM operate in parallel without band conflicts; and generating, based on the confirming, the RF handle data that comprises the remaining set of CCs.

Example 16 includes a UE of examples 12-15 or some other example herein, wherein generating the RF handle data based on the non-exhaustive PCT search comprises: determining that the amount of time exceeds a minimum time threshold; based on the determining, receiving data specifying a signal condition level; determining that the signal condition level does not satisfy a threshold signal condition level; in response to determining that the signal condition level does not satisfy the threshold signal condition level, retaining (i) primary cell (PCell) data and (ii) primary cell of a secondary cell group (PSCell) data in a packet call; and generating the RF handle data comprising a first CC for the first SIM representing an Idle operation and a second CC for the second SIM, the second CC including the PCell data and the PSCell data for the second SIM.

Example 17 includes a UE of examples 11-16 or some other example herein, wherein the threshold amount of time is determined based on timing of one or more paging operations of the first SIM or the second SIM.

Example 18 includes a UE of examples 11-17 or some other example herein, the operations comprising receiving conflict data specifying at least one SCell band conflict for the first SIM; determining, in response to receiving the conflict data, that the second SIM is not active; and generating RF handle data specifying a packet call having full capacity support including all CCs.

Example 19 includes a UE of examples 11-18 or some other example herein, the operations further comprising: receiving conflict data specifying at least one SCell band conflict for the first SIM; determining, in response to receiving the conflict data, that the second SIM is active; and generating RF handle data specifying a packet call having reduced capacity support by removing at least one of a conflicting Rx CC, a conflicting Tx CC, or a conflicting Rx CC Rx path.

Example 20 includes a UE of examples 11-19 or some other example herein, wherein determining a type of the conflict comprises: determining that the conflict includes a Pcell-PScell conflict between the first SIM and the second SIM; determining that one of the first SIM or the second SIM is idle; suspending a packet call when one of the first SIM or the second SIM that is idle is prepared for paging operations that include a streaming activity; and resuming the packet call when the streaming activity is completed.

Example 21 may include a signal as described in or related to any of examples 1-20, or portions or parts thereof.

Example 22 may include a datagram, information element, packet, frame, segment, PDU, or message as described in or related to any of examples 1-19, or portions or parts thereof, or otherwise described in the present disclosure.

Example 23 may include a signal encoded with data as described in or related to any of examples 1-20, or portions or parts thereof, or otherwise described in the present disclosure.

Example 24 may include a signal encoded with a datagram, IE, packet, frame, segment, PDU, or message as described in or related to any of examples 1-20, or portions or parts thereof, or otherwise described in the present disclosure.

Example 25 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 26 may include a computer program comprising instructions, wherein execution of the program by a processing element is to cause the processing element to carry out the method, techniques, or process as described in or related to any of examples 1-20, or portions thereof.

Example 27 may include a signal in a wireless network as shown and described herein.

Example 28 may include a method of communicating in a wireless network as shown and described herein.

Example 29 may include a system for providing wireless communication as shown and described herein.

Example 30 may include a device for providing wireless communication as shown and described herein.

What is claimed is:

1. A method comprising:
   receiving event data indicating a trigger event configuring radio frequency (RF) hardware for a dual-receive, dual subscriber identity module (SIM) dual standby (DR-DSDS) operation;
   identifying a conflict between a communication band of a first SIM and a communication band of a second SIM for the DR-DSDS operation;
   determining a type of the conflict;
   upon determining the type of the conflict, determining, a first priority value for a component carrier (CC) of the DR-DSDS operation corresponding to the first SIM, and a second priority value for a CC of the DR-DSDS operation corresponding to the second SIM, the first and second priority values based at least on the type of the conflict;
   determining a timing scenario for configuring the RF hardware;
   wherein determining the timing scenario comprises:
      determining an amount of time between the trigger event and a next idle activity of the first SIM or the second SIM; and
      comparing the amount of time to a threshold amount of time;
   based on determining the timing scenario and based on comparing the amount of time to the threshold amount of time, performing a search for a RF hardware configuration for a resolution of the conflict based on the first and second priority values; and
   in response to performing the search, generating RF handle data corresponding to the resolution of the conflict, the RF handle data specifying the RF hardware configuration for the DR-DSDS operation.

2. The method of claim 1, wherein performing the search for the RF hardware configuration comprises performing one of a non-exhaustive path configuration table (PCT) search or an exhaustive PCT search, comprising:
   when the amount of time exceeds the threshold amount of time, generating the RF handle data based on the non-exhaustive PCT search; and
   when the amount of time does not exceed the threshold amount of time, generating the RF handle data based on the exhaustive PCT search.

3. The method of claim 2, wherein generating the RF handle data based on the exhaustive PCT search comprises:
   determining that the type of the conflict comprises a transmit (Tx) CC on the first SIM that conflicts with a receive (Rx) CC on the second SIM; and
   based on determining that the type of the conflict comprises the transmit (Tx) CC on the first SIM that conflicts with the receive (Rx) CC on the second SIM, generating the RF handle data that drops the Tx CC that conflicts with the Rx CC.

4. The method of claim 2, wherein generating the RF handle data based on the exhaustive PCT search comprises:
   determining that the type of the conflict comprises a first Rx CC on the first SIM and a second Rx CC on the second SIM and that the conflict comprises a Rx chain resource conflict; and
   based on determining that the type of the conflict comprises the first Rx CC on the first SIM and the second Rx CC on the second SIM and that the conflict comprises the Rx chain resource conflict, generating the RF handle data that removes at least one Rx path from the first Rx CC and assigns the at least one Rx path to the second CC, the first Rx CC having a lower priority compared to the second Rx CC.

5. The method of claim 2, wherein generating the RF handle data based on the non-exhaustive PCT search comprises:
  determining that the amount of time exceeds a minimum time threshold;
  based on determining that the amount of time exceeds the minimum time threshold, receiving data specifying a signal condition level;
  determining that the signal condition level satisfies a threshold signal condition level;
  in response to determining that the signal condition level satisfies the threshold signal condition level, dropping a CC that has a lowest priority of a set of CCs from the RF handle data;
  confirming, in response to dropping the CC having the lowest priority from the RF handle data, that a remaining set of CCs of the set of CCs represent a compatible RF handle in which the first SIM and the second SIM operate in parallel without band conflicts; and
  generating, based on the confirming, the RF handle data that comprises the remaining set of CCs.

6. The method of claim 2, wherein generating the RF handle data based on the non-exhaustive PCT search comprises:
  determining that the amount of time exceeds a minimum time threshold;
  based on determining that the amount of time exceeds the minimum time threshold, receiving data specifying a signal condition level;
  determining that the signal condition level does not satisfy a threshold signal condition level;
  in response to determining that the signal condition level does not satisfy the threshold signal condition level, retaining (i) primary cell (PCell) data and (ii) primary cell of a secondary cell group (PSCell) data in a packet call; and
  generating the RF handle data comprising a first CC for the first SIM representing an Idle operation and a second CC for the second SIM, the second CC including the PCell data and the PSCell data for the second SIM.

7. The method of claim 2, wherein the threshold amount of time is determined based on timing of one or more paging operations of the first SIM or the second SIM.

8. The method of claim 1, further comprising:
  receiving conflict data specifying at least one SCell band conflict for the first SIM;
  determining, in response to receiving the conflict data, that the second SIM is not active; and
  generating the RF handle data specifying a packet call having full capacity support including all CCs.

9. The method of claim 1, further comprising:
  receiving conflict data specifying at least one SCell band conflict for the first SIM;
  determining, in response to receiving the conflict data, that the second SIM is active; and
  generating the RF handle data specifying a packet call having reduced capacity support by removing at least one of a conflicting Rx CC, a conflicting Tx CC, or a conflicting Rx path.

10. The method of claim 1, wherein determining the type of the conflict comprises:
  determining that the conflict includes a Pcell-PScell conflict between the first SIM and the second SIM;
  determining that one of the first SIM or the second SIM is idle;
  suspending a packet call when one of the first SIM or the second SIM that is idle is prepared for paging operations that include a streaming activity; and
  resuming the packet call when the streaming activity is completed.

11. An apparatus, comprising:
  at least one processor in communication with a first subscriber identity module (SIM), a second SIM, and radio frequency (RF) hardware, the at least one processor configured to perform operations comprising:
    receiving event data indicating a trigger event configuring the RF hardware for a dual-receive, dual-SIM dual standby (DR-DSDS) operation;
    identifying a conflict between a communication band of the first SIM and a communication band of the second SIM for the DR-DSDS operation;
    determining a type of the conflict;
    upon determining the type of the conflict, determining, a first priority value for a component carrier (CC) of the DR-DSDS operation corresponding to the first SIM, and a second priority value for a CC of the DR-DSDS operation corresponding to the second SIM, the first and second priority values based at least on the type of the conflict;
    determining a timing scenario for configuring the RF hardware, wherein determining the timing scenario comprises:
      determining an amount of time between the trigger event and a next idle activity of the first SIM or the second SIM; and
      comparing the amount of time to a threshold amount of time;
    based on determining the timing scenario and based on comparing the amount of time to the threshold amount of time, performing a search for a RF hardware configuration for a resolution of the conflict based on the first and second priority values; and
    in response to performing the search, generating RF handle data corresponding to the resolution of the conflict, the RF handle data specifying the RF hardware configuration for the DR-DSDS operation.

12. The apparatus of claim 11, wherein performing the search for the RF hardware configuration comprises performing one of a non-exhaustive path configuration table (PCT) search or an exhaustive PCT search, comprising:
  when the amount of time exceeds the threshold amount of time, generating the RF handle data based on the non-exhaustive PCT search; and
  when the amount of time does not exceed the threshold amount of time, generating the RF handle data based on the exhaustive PCT search.

13. The apparatus of claim 12, wherein generating the RF handle data based on the exhaustive PCT search comprises:
  determining that the type of the conflict comprises a transmit (Tx) CC on the first SIM that conflicts with a receive (Rx) CC on the second SIM; and
  based on determining that the type of the conflict comprises the transmit (Tx) CC on the first SIM that conflicts with the receive (Rx) CC on the second SIM, generating the RF handle data that drops the Tx CC that conflicts with the Rx CC.

14. The apparatus of claim 12, wherein generating the RF handle data based on the exhaustive PCT search comprises:

determining that the type of the conflict comprises a first Rx CC on the first SIM and a second Rx CC on the second SIM and that the conflict comprises a Rx chain resource conflict; and based on determining that the type of the conflict comprises the first Rx CC on the first SIM and the second Rx CC on the second SIM and that the conflict comprises the Rx chain resource conflict, generating the RF handle data that removes at least one Rx path from the first Rx CC and assigns the at least one Rx path to the second CC, the first Rx CC having a lower priority compared to the second Rx CC.

15. The apparatus of claim 12, wherein generating the RF handle data based on the non-exhaustive PCT search comprises:

determining that the amount of time exceeds a minimum time threshold;

based on determining that the amount of time exceeds the minimum time threshold, receiving data specifying a signal condition level;

determining that the signal condition level satisfies a threshold signal condition level;

in response to determining that the signal condition level satisfies the threshold signal condition level, dropping a CC that has a lowest priority of a set of CCs from the RF handle data;

confirming, in response to dropping the CC having the lowest priority from the RF handle data, that a remaining set of CCs of the set of CCs represent a compatible RF handle in which the first SIM and the second SIM operate in parallel without band conflicts; and generating, based on the confirming, the RF handle data that comprises the remaining set of CCs.

16. The apparatus of claim 12, wherein generating the RF handle data based on the non-exhaustive PCT search comprises:

determining that the amount of time exceeds a minimum time threshold;

based on determining that the amount of time exceeds the minimum time threshold, receiving data specifying a signal condition level;

determining that the signal condition level does not satisfy a threshold signal condition level;

in response to determining that the signal condition level does not satisfy the threshold signal condition level, retaining (i) primary cell (PCell) data and (ii) primary cell of a secondary cell group (PSCell) data in a packet call; and generating the RF handle data comprising a first CC for the first SIM representing an Idle operation and a second CC for the second SIM, the second CC including the PCell data and the PSCell data for the second SIM.

17. The apparatus of claim 12, wherein the threshold amount of time is determined based on timing of one or more paging operations of the first SIM or the second SIM.

18. The apparatus of claim 11, the operations further comprising:

receiving conflict data specifying at least one SCell band conflict for the first SIM;

determining, in response to receiving the conflict data, that the second SIM is not active; and generating the RF handle data specifying a packet call having full capacity support including all CCs.

19. The apparatus of claim 11, the operations further comprising:

receiving conflict data specifying at least one SCell band conflict for the first SIM;

determining, in response to receiving the conflict data, that the second SIM is active; and generating the RF handle data specifying a packet call having reduced capacity support by removing at least one of a conflicting Rx CC, a conflicting Tx CC, or a conflicting Rx path.

20. The apparatus of claim 11, wherein determining the type of the conflict comprises:

determining that the conflict includes a Pcell-PScell conflict between the first SIM and the second SIM;

determining that one of the first SIM or the second SIM is idle;

suspending a packet call when one of the first SIM or the second SIM that is idle is prepared for paging operations that include a streaming activity; and resuming the packet call when the streaming activity is completed.

* * * * *

UNITED STATES PATENT AND TRADEMARK OFFICE
CERTIFICATE OF CORRECTION

| | | |
|---|---|---|
| PATENT NO. | : 12,375,122 B2 | Page 1 of 1 |
| APPLICATION NO. | : 17/934928 | |
| DATED | : July 29, 2025 | |
| INVENTOR(S) | : Beibei Wang et al. | |

It is certified that error appears in the above-identified patent and that said Letters Patent is hereby corrected as shown below:

In the Claims

Column 33, Line 1, In Claim 4, after "second" insert -- Rx --;

Column 35, Line 11, In Claim 14, after "second" insert -- Rx --.

Signed and Sealed this
Fourteenth Day of October, 2025

John A. Squires
*Director of the United States Patent and Trademark Office*